United States Patent [19]

Manuel et al.

[11] Patent Number: 4,750,920

[45] Date of Patent: Jun. 14, 1988

[54] SINGLE PASS MUD REJUVENATION SYSTEM AND METHOD

[75] Inventors: William S. Manuel, Houston, Tex.; Herman J. Schellstede, New Iberia, La.

[73] Assignee: Ramteck Systems, Inc., Houston, Tex.

[21] Appl. No.: 880,542

[22] Filed: Jun. 30, 1986

[51] Int. Cl.$^4$ .................... B01D 19/00; B01D 30/04
[52] U.S. Cl. .......................................... 55/52; 55/55; 55/190; 55/203; 210/400; 210/406; 210/456; 210/783
[58] Field of Search .................. 175/66; 55/159, 189, 55/190, 199, 201, 203, 52, 55; 198/575, 537, 540, 790; 29/116 R; 209/270, 272, 307, 247, 250, 254, 321; 210/194, 196, 247, 386, 391, 393, 400, 401, 406, 402, 416.1, 456, 768, 772, 780, 783, 784, 791, 805

[56] References Cited

U.S. PATENT DOCUMENTS 4,084,946  4/1978  Burgess ........................ 55/199 X
4,255,269  3/1981  Timmer ......................... 175/66 X
4,483,770  11/1984 Casey et al. .................... 210/401
4,639,258  1/1987  Schellstede et al. ............... 55/52

*Primary Examiner*—Richard V. Fisher
*Assistant Examiner*—W. Gary Jones
*Attorney, Agent, or Firm*—Mason, Fenwick & Lawrence

[57] ABSTRACT

Apparatus for separating relatively large undesirable particles from a slurry includes an endless movable filter belt mounted for movement along a horizontal path and supply means depositing slurry carrying large particles on the upper surface of the filter means. Pressurized gas jets are positioned beneath the lower surface of the filter means in the area beneath which the slurry and relatively large particles are deposited to agitate same and suction means beneath the filter belt to separate the slurry from the relatively large particles to provide purified slurry. Gas from the slurry is separated by a degasser having a spiral floor partition which slurry comprises drilling mud and said large particles comprise earth cuttings comprises a common wall between gas and slurry outflow conduits in a space-saving manner.

20 Claims, 15 Drawing Sheets

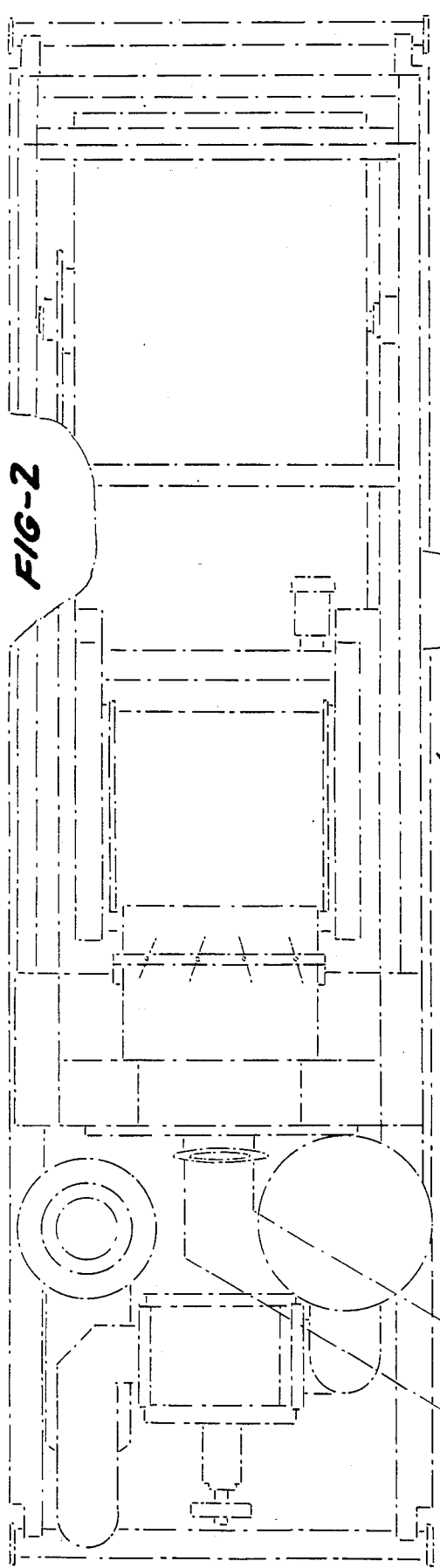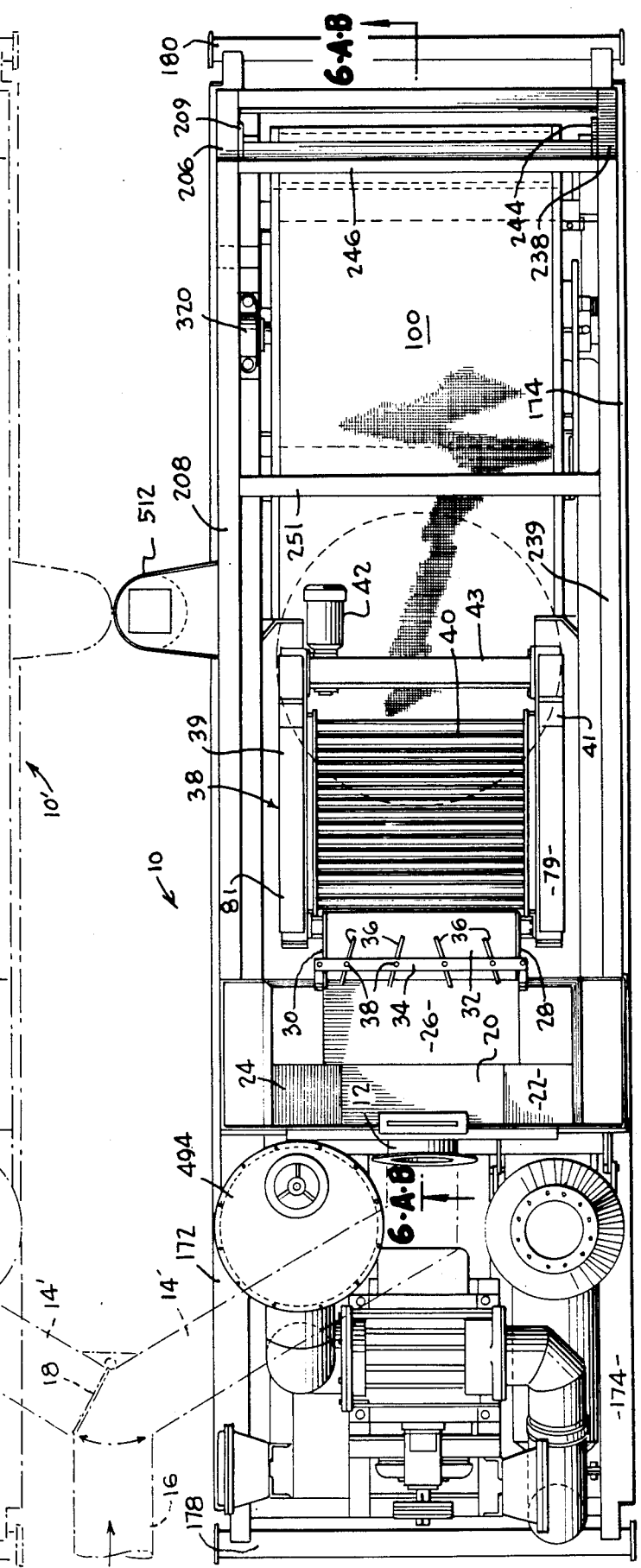
FIG-2

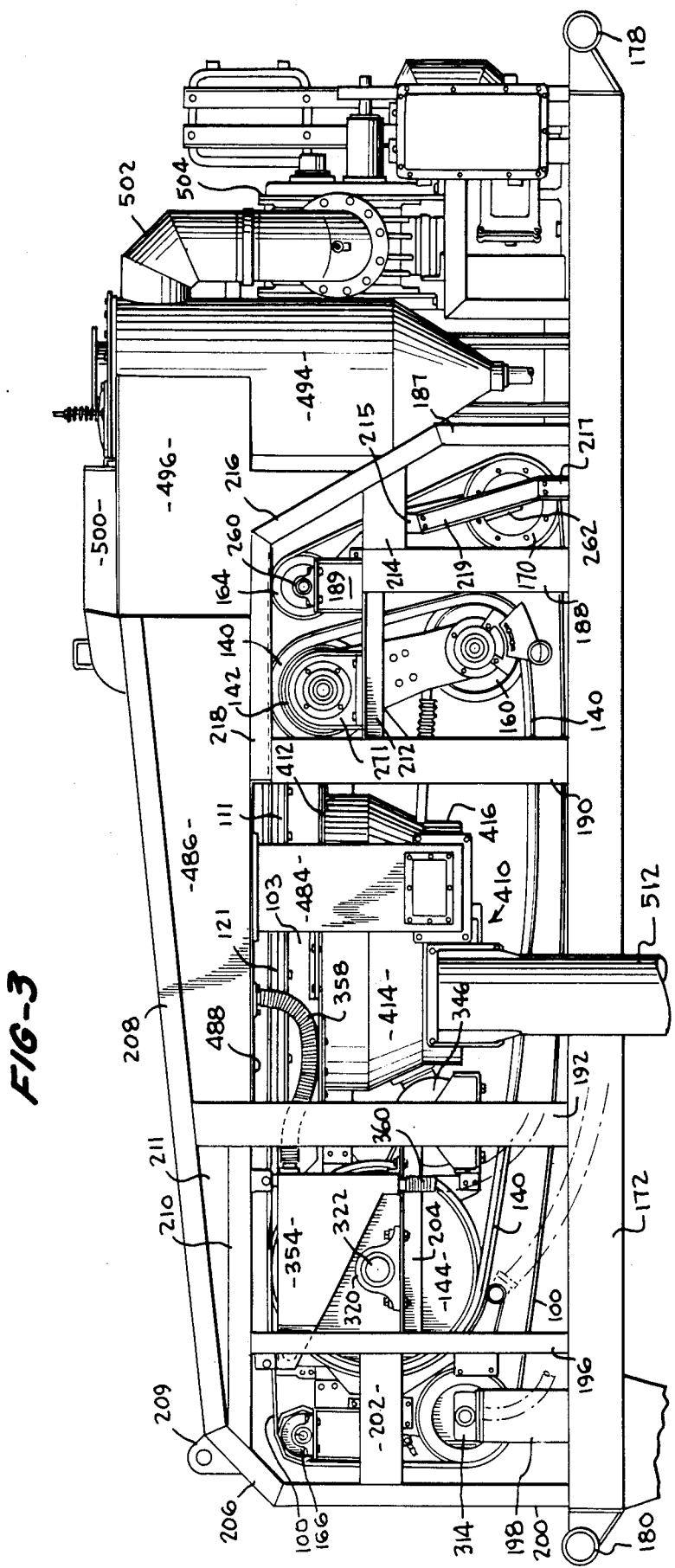

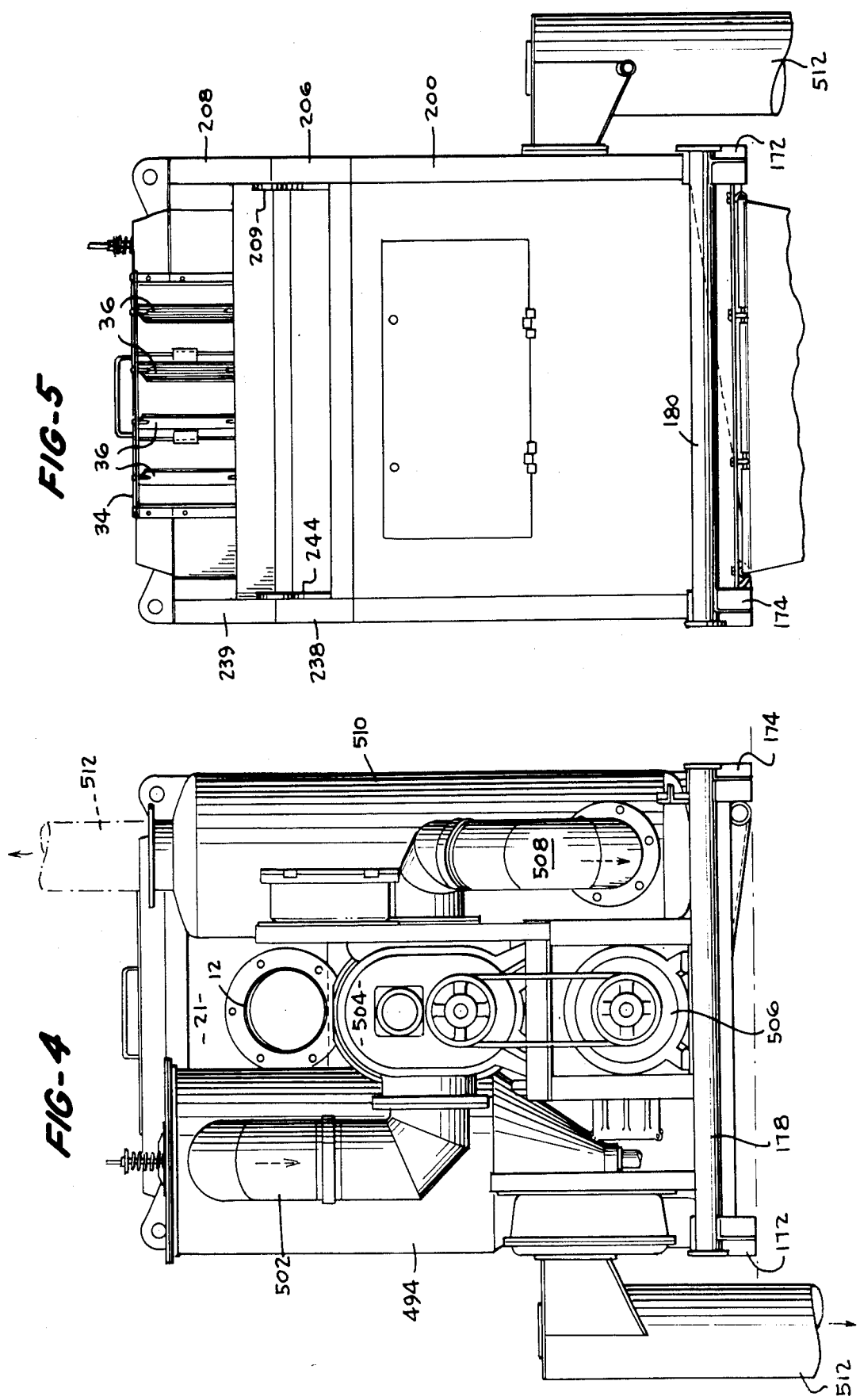

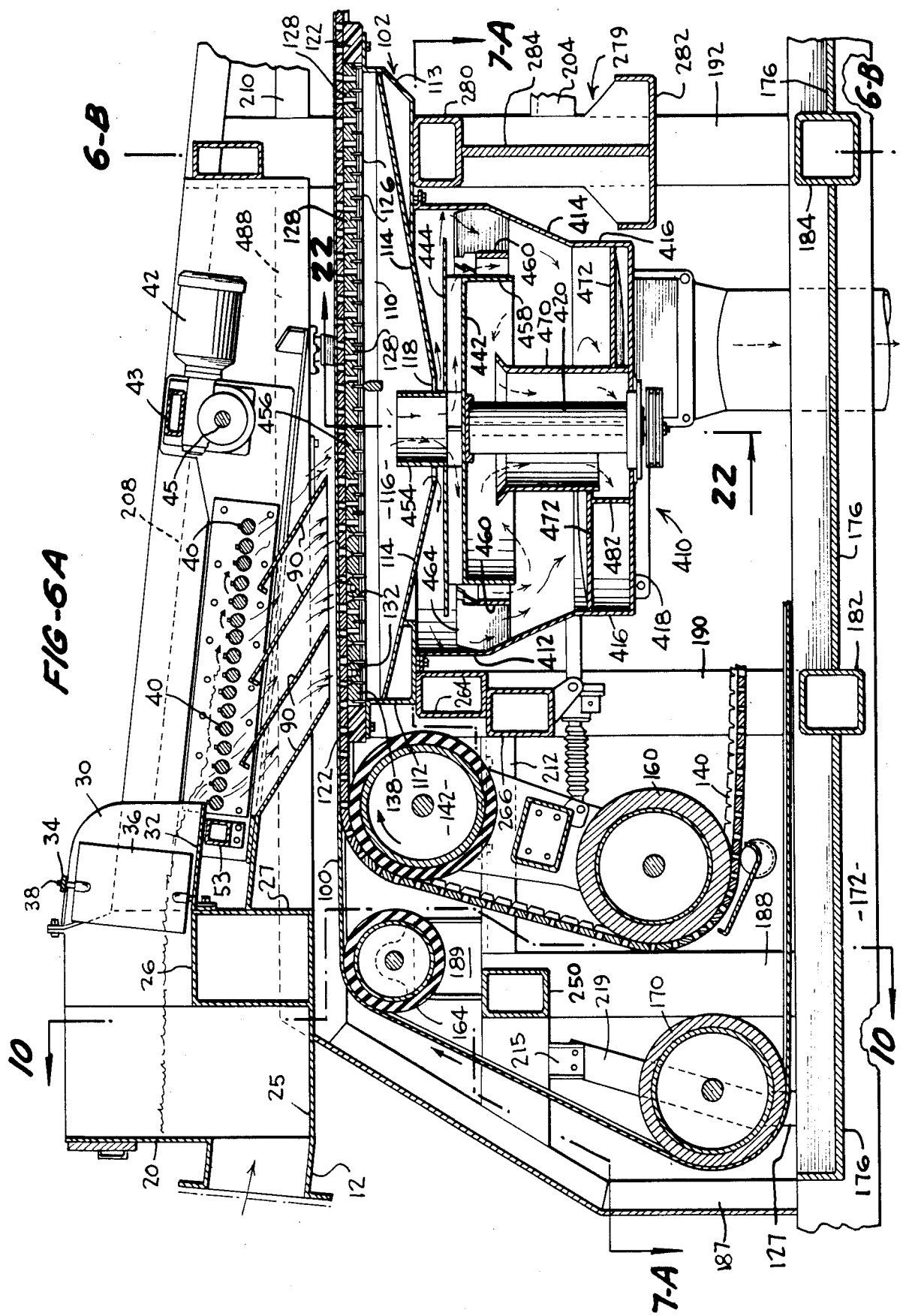

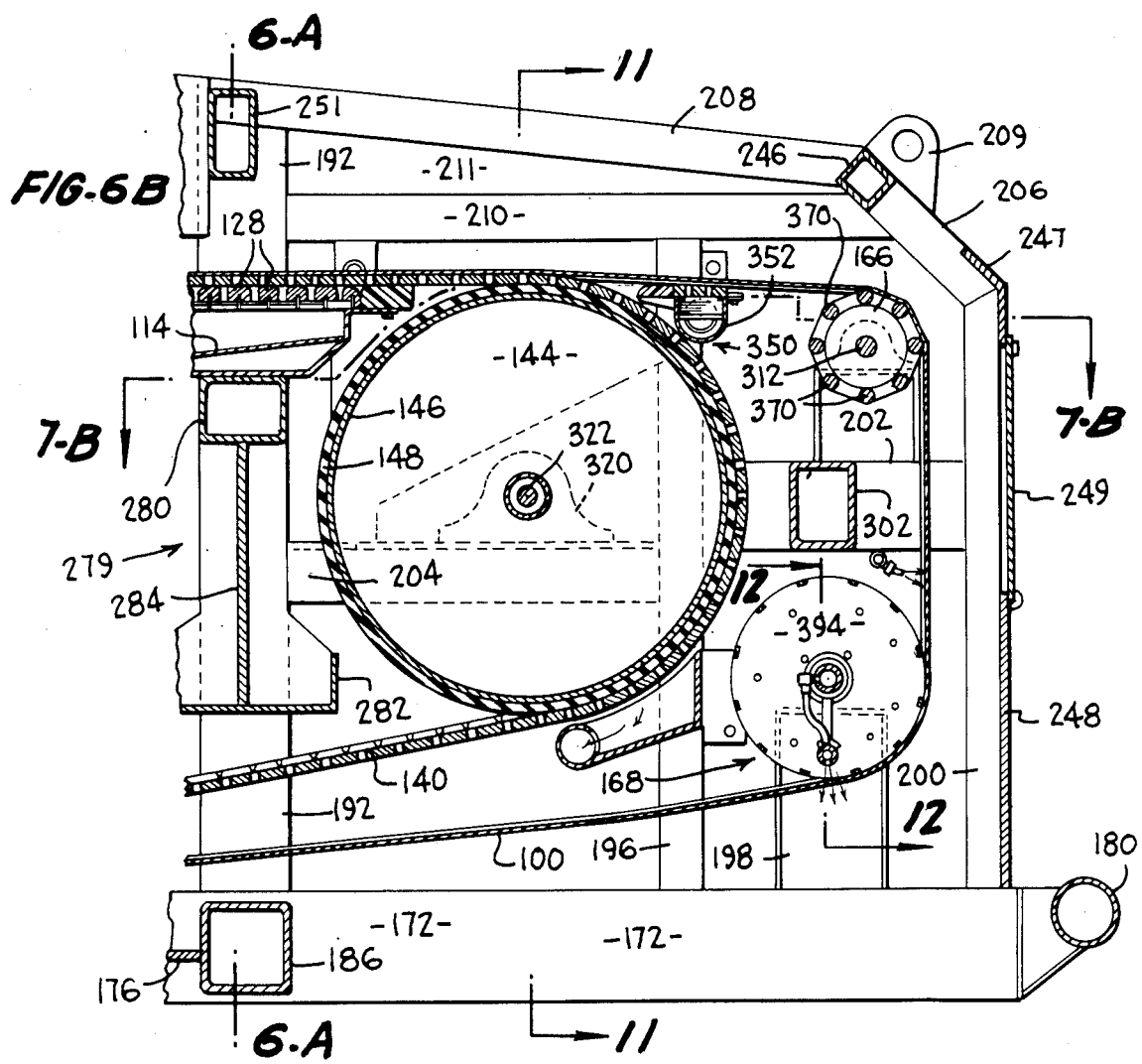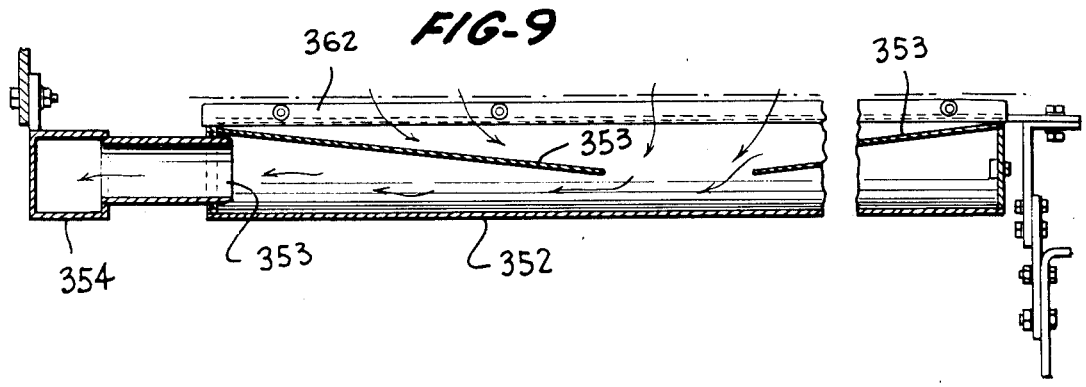

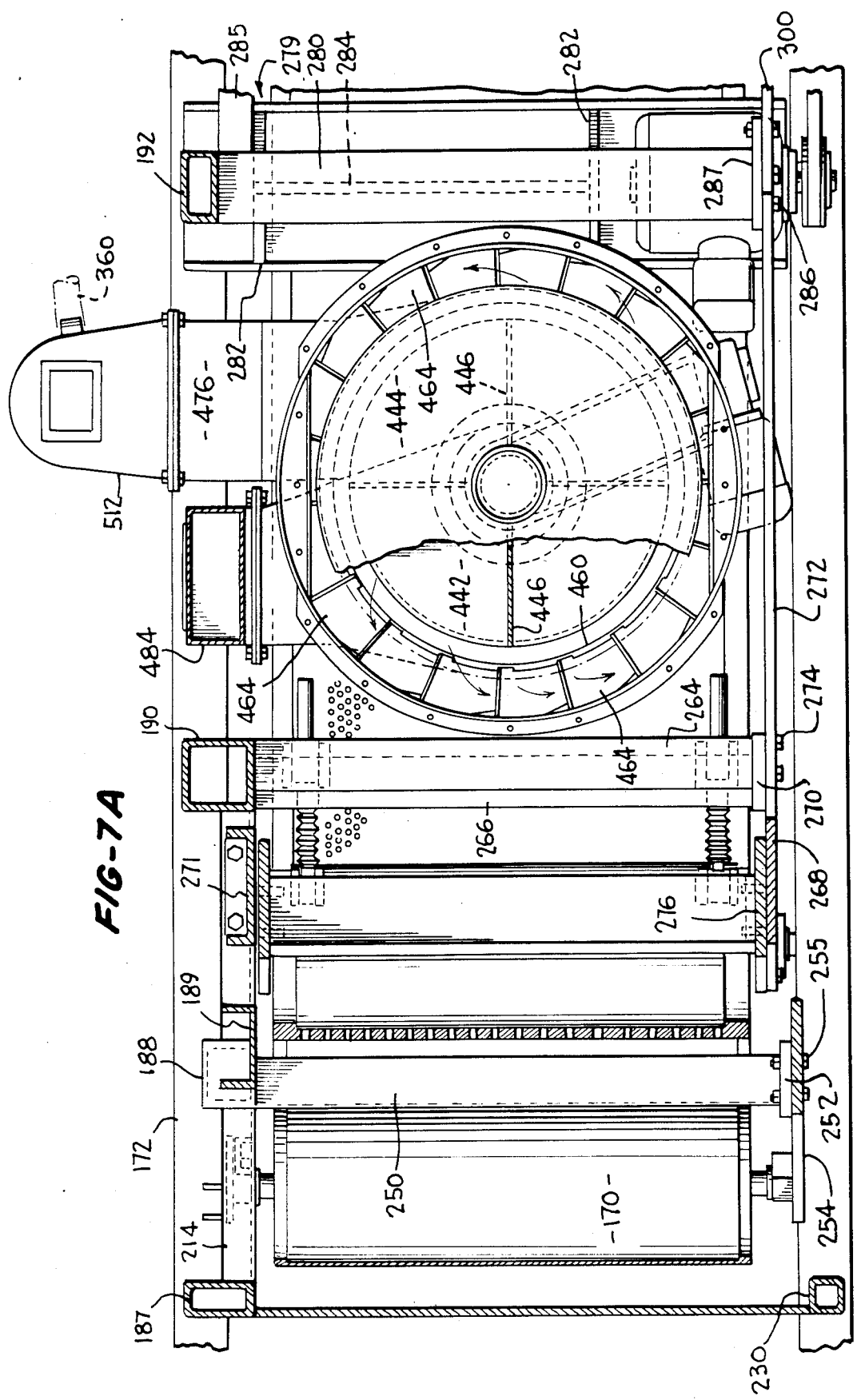

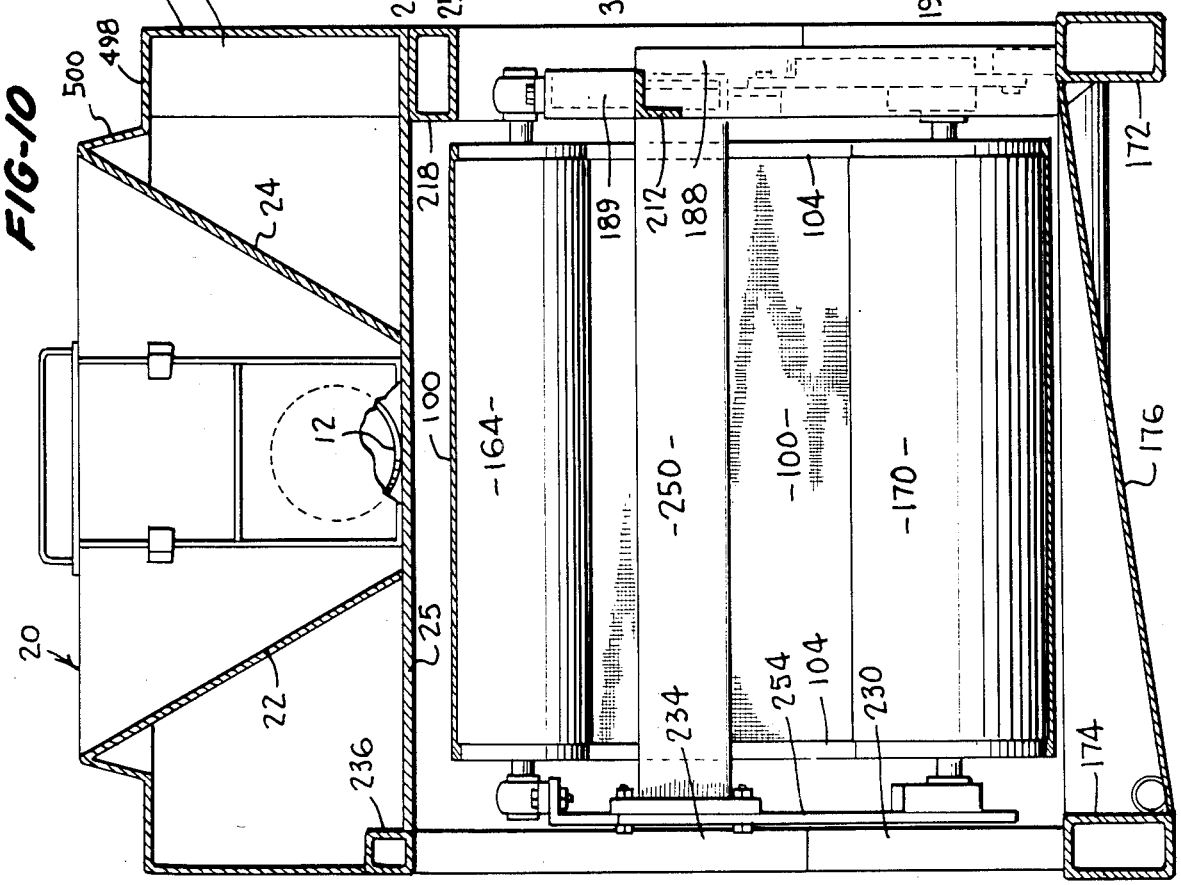

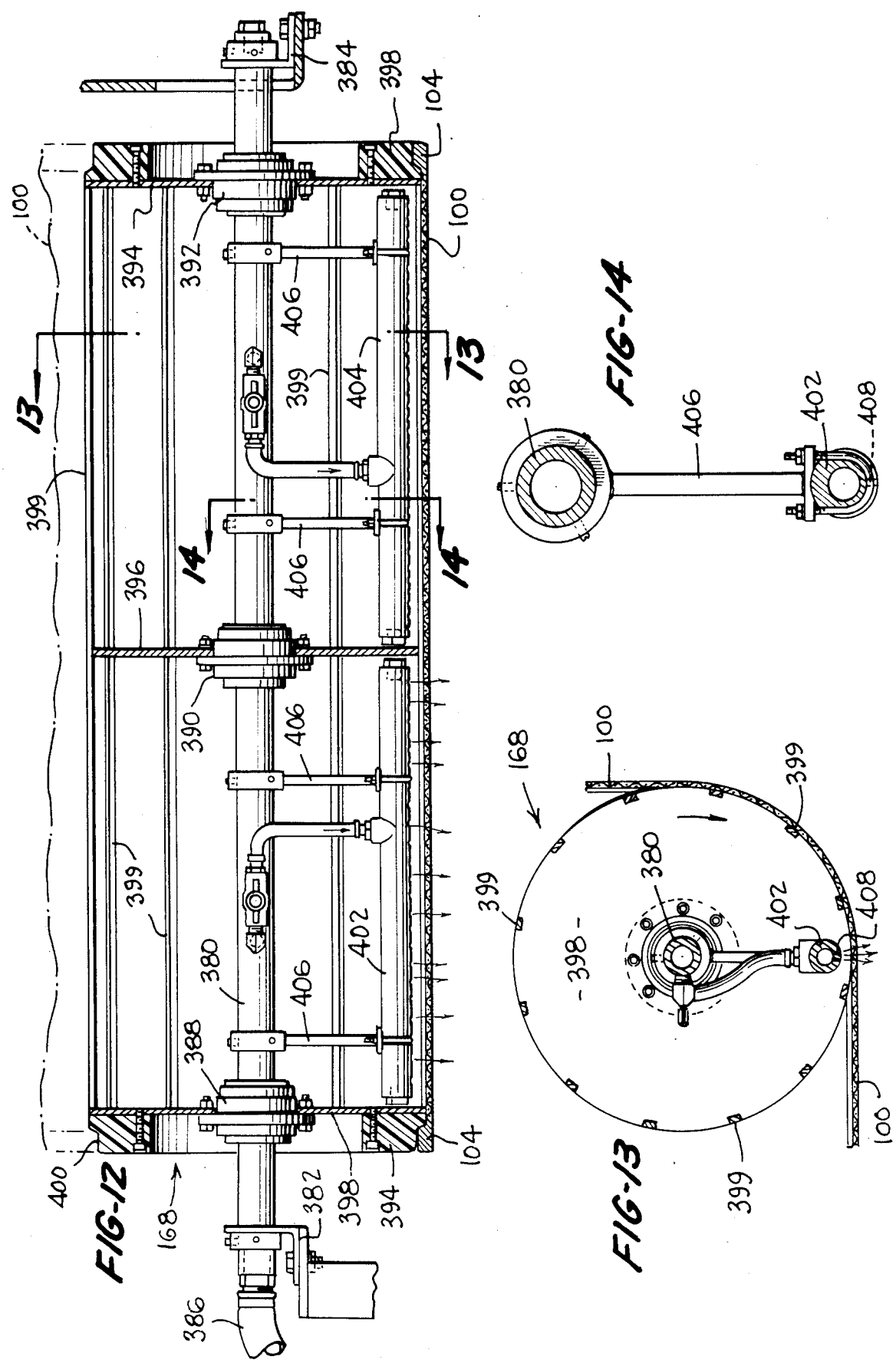

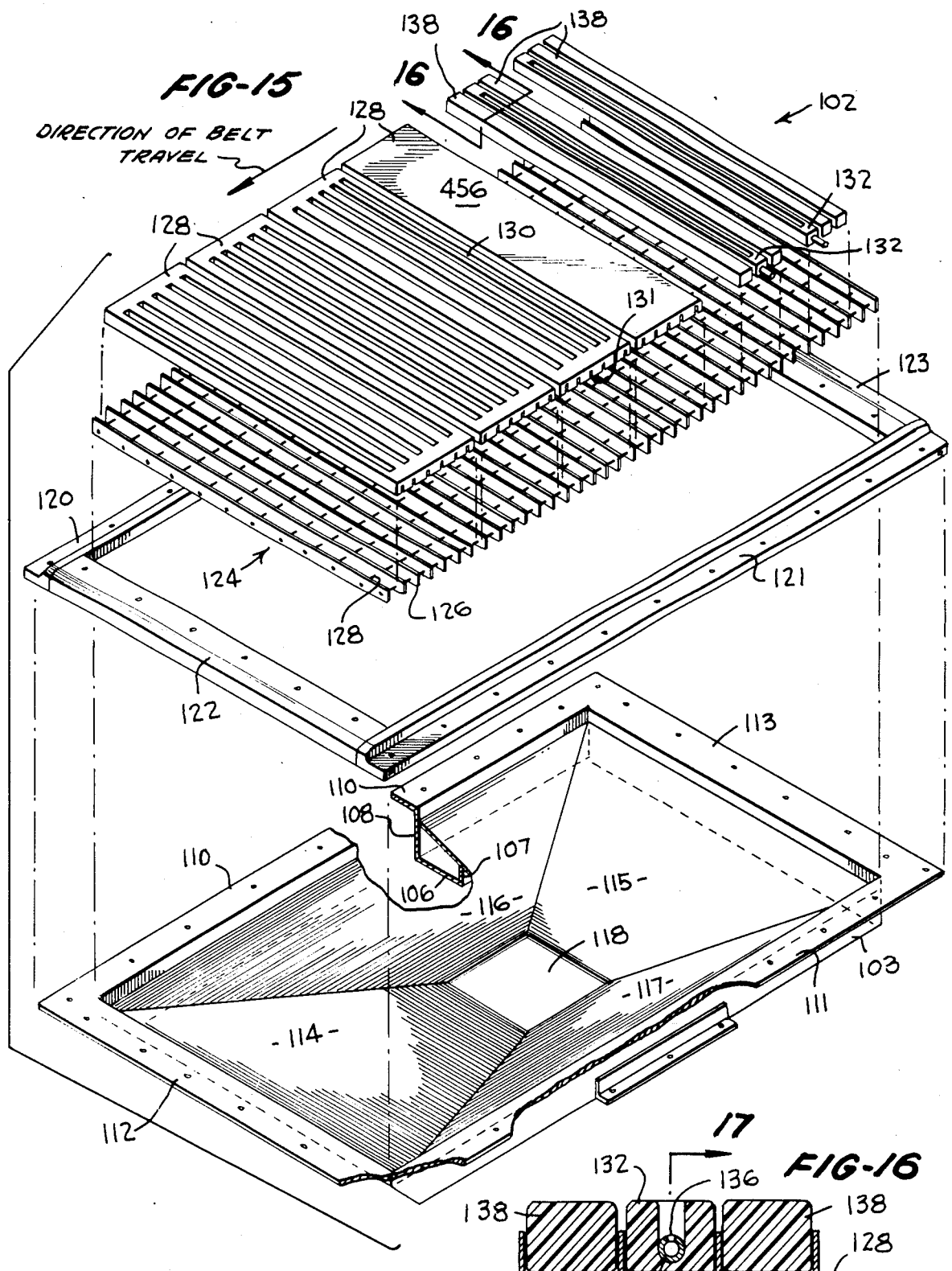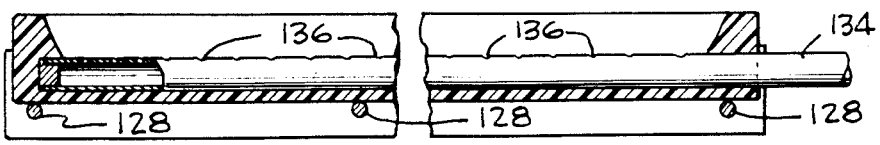

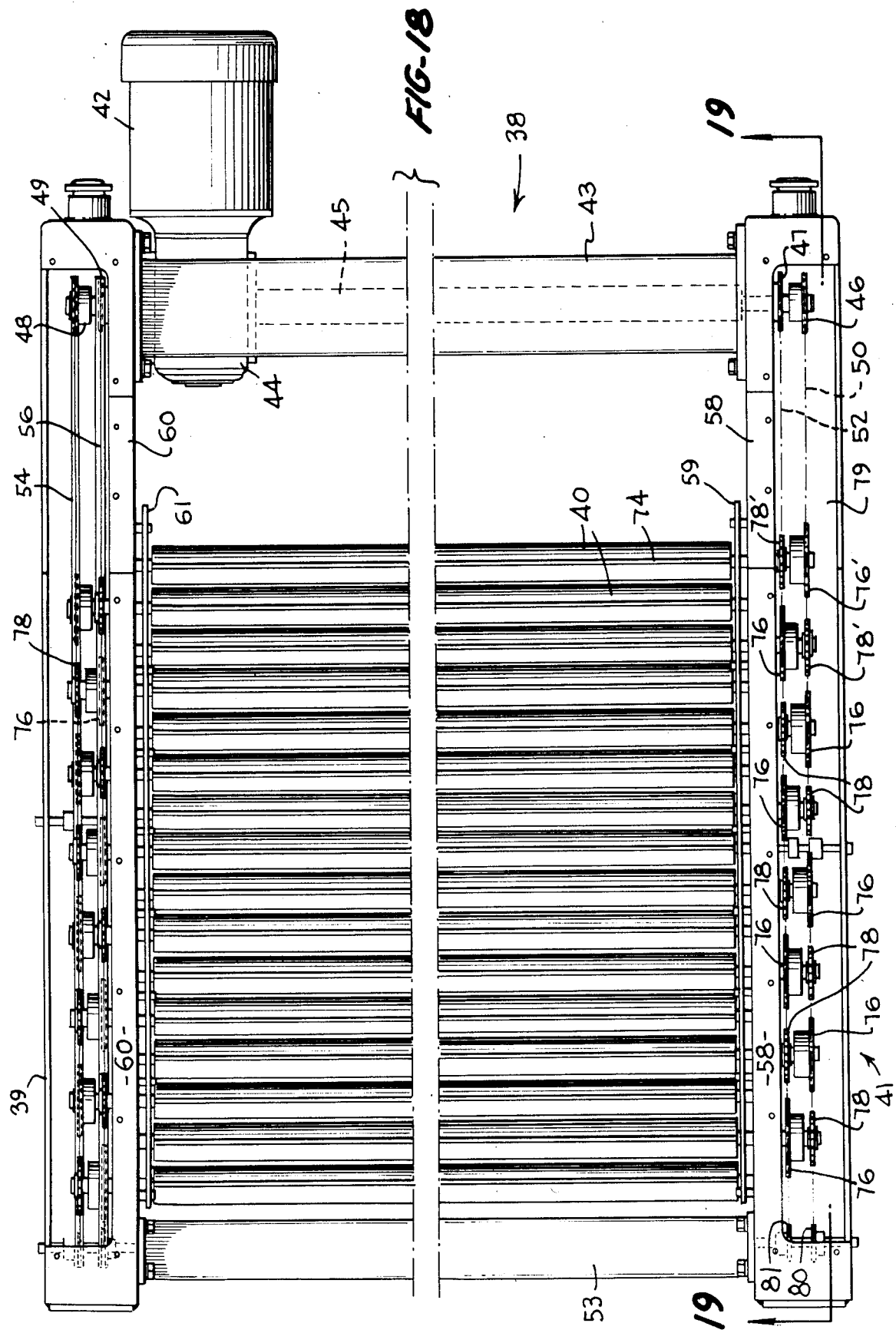

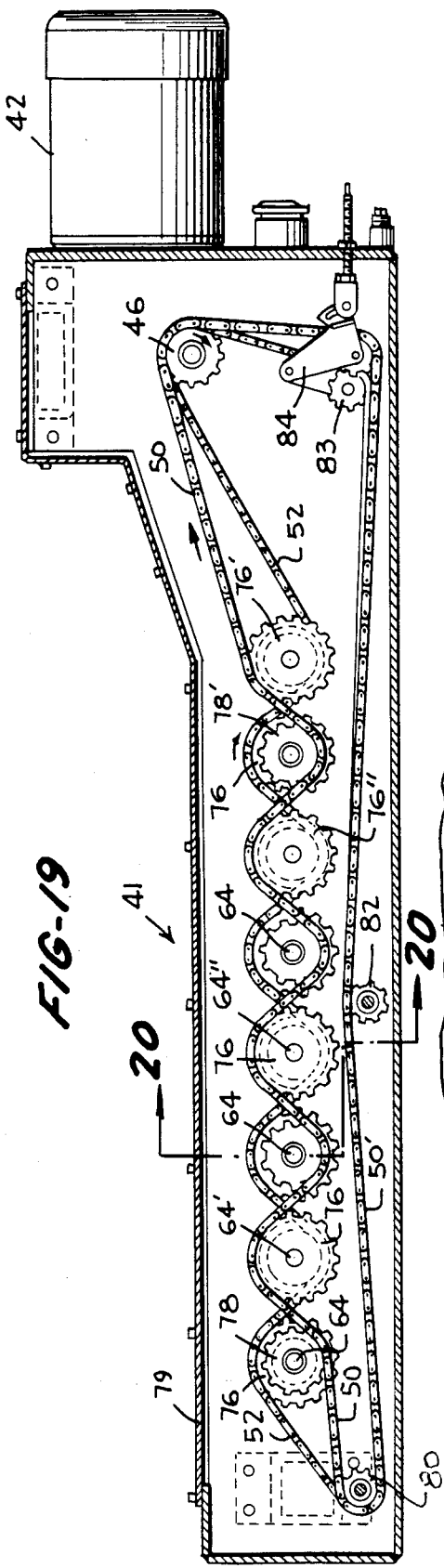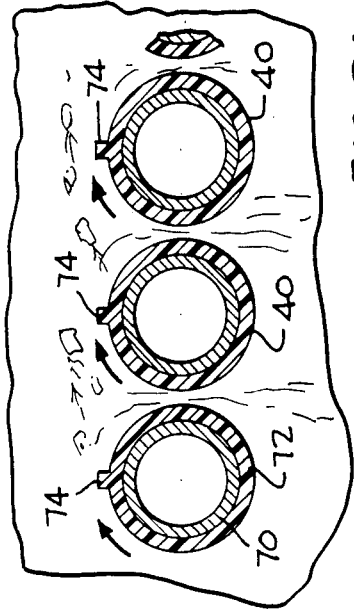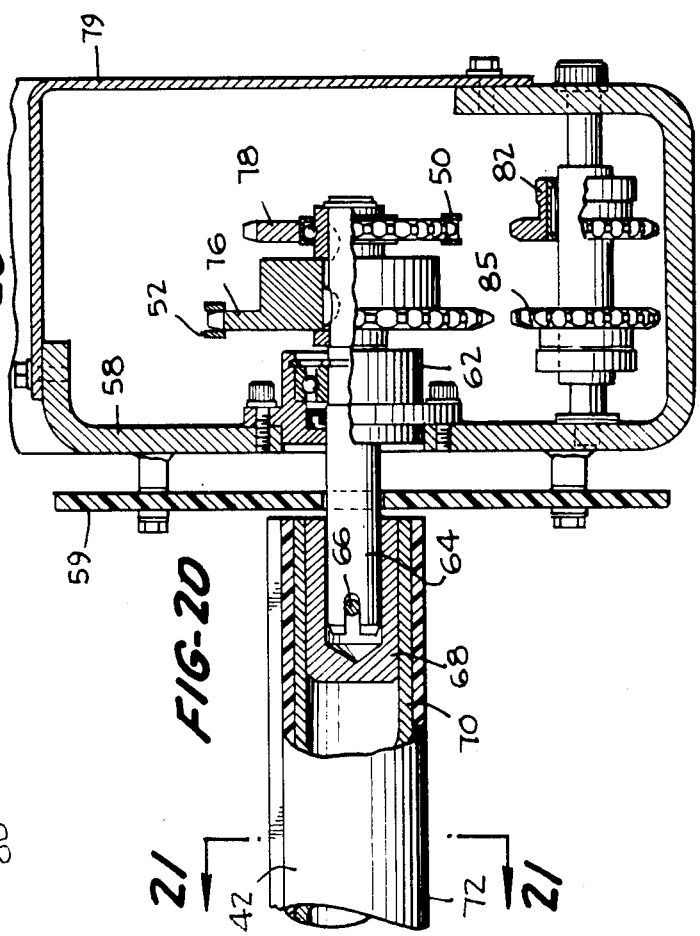

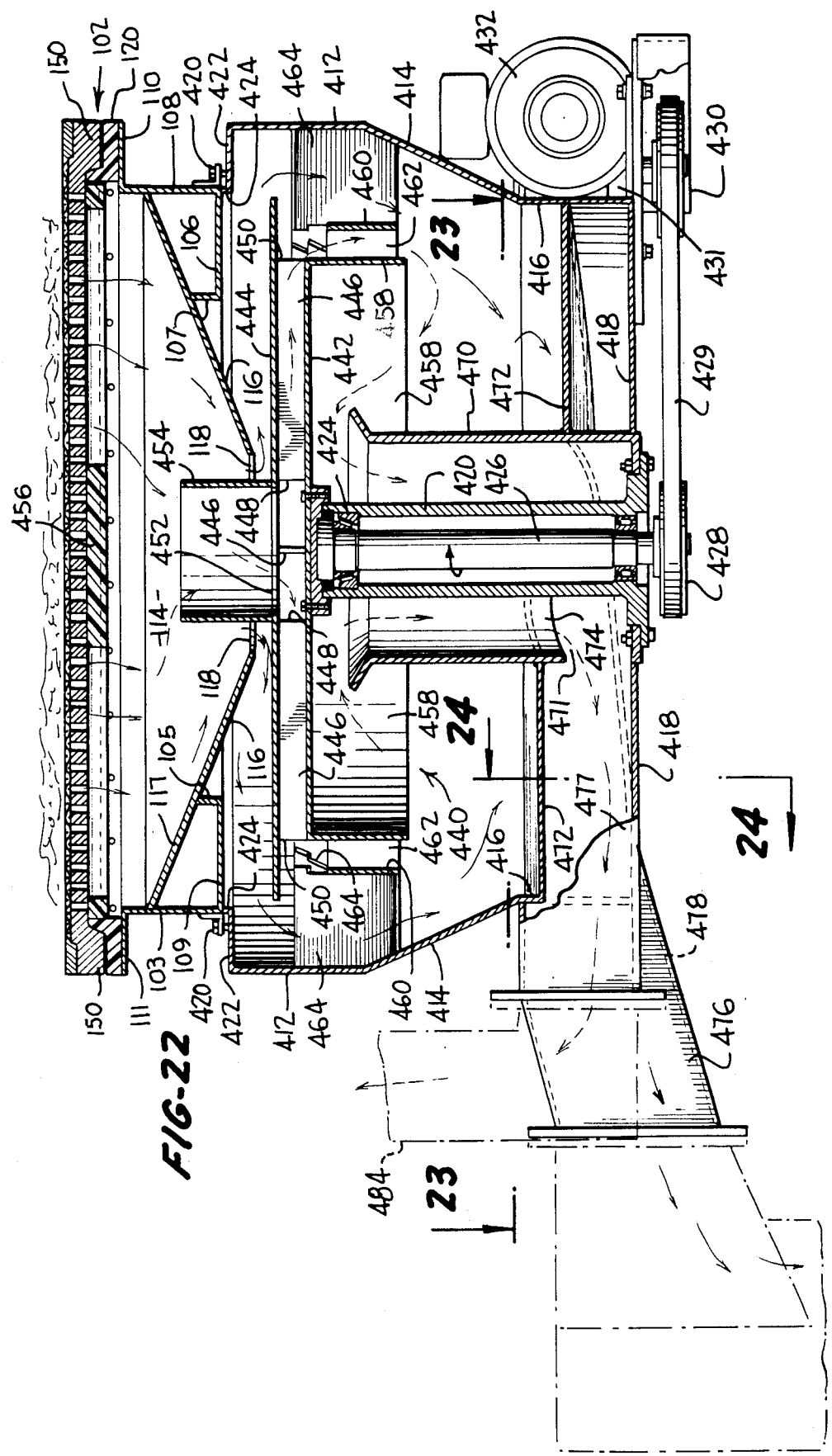

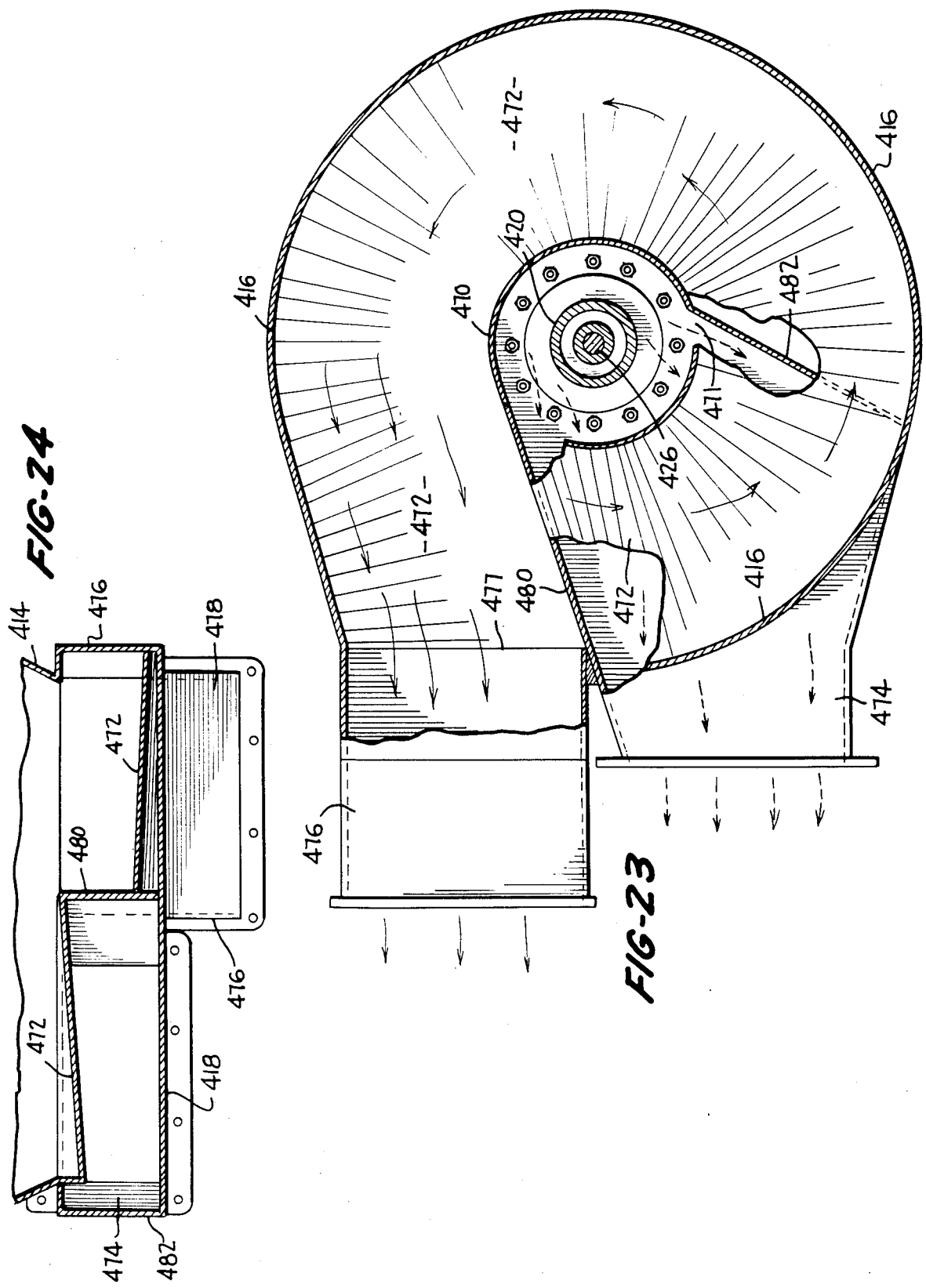

SINGLE PASS MUD REJUVENATION SYSTEM AND METHOD

BACKGROUND OF THE INVENTION

The present invention is directed to a method and apparatus and rejuvenating drilling mud from an oil, gas or other similar well and form similarly rejuvenating other slurries containing solid impurities.

In the drilling of oil wells, drilling mud is forced down the drill string, emerging therefrom at the drill bit, and then passes upwardly on the outside of the drill string between the drill string and the wall forming the bore hole. The drilling mud which is frequently referred to as "drilling fluid" comprises a slurry formed of a liquid carrier such as water as diesel fuel and usually includes solid additives such as extremely fine barite particles of less than 74 microns in size. The drilling mud functions to carry the cuttings to the surface, to control the pressure in the formation being drilled, to lubricate the drill string and the bit and to avoid sidewall collapse of the bore hole. Various additives are supplied to the drilling mud to improve its performance; since the additives have substantial value, it is desirable that their loss be avoided. Rejuvenation of drilling mud includes the removal of the earth cuttings. The terms "solids" and "cuttings" as used hereinafter refer to stone or earth particles cut from the earth by the drilling bit.

It is well known that the presence of cuttings in the drilling mud has such harmful effects as decreasing the life of pumps and other expensive equipment. However, removal of the cuttings with a substantial portion of expensive prior known equipment normally results in the loss of additives, such as barite. It is also desirable that substantially all of the entrained gases and air be removed, and that the drilling mud not be diluted. At the present time, it is conventional to remove cuttings by such devices as shale shakers, desanders, desilters, and centrifuges. Degassers are also utilized when needed.

Thus, the drilling fluid must be maintained in good physical and chemical condition in order to be able to perform its intended functions. The cuttings range in size from large pieces (¾ in. diam.) to very fine particles. The large cuttings, if permitted to be circulated in the fluid down the drillpipe, would plug up the rock bit channels and the drill string tools. Removal of the large cuttings has been previously accomplished by passing the drilling fluid stream over a coarse vibrating screen (shale shaker) where the large pieces are screened out. Unfortunately, the vibratory action of the shale shaker causes many high pressure forces to be applied to the cuttings particles causing them to be reduced in size so as to render them more difficult to separate from the drilling fluid; thus, while the shale shaker improves the mud by removing the larger cuttings particles, it also has the negative effect of increasing the number of smaller cuttings particles which pass through the screen and remain in the mud. Subsequent passage through hydrocyclones and pumps further shear and degrade the cuttings. The smaller cuttings particles in the drilling fluid are not easily removed and their presence can have very detrimental effects on the entire drilling process. As cuttings content builds up, severe abrasion of the rock bit and drill string tools takes place and the properties of the drilling fluid itself are seriously impaired and tend to become uncontrollable. Moreover, cake deposition of cuttings particles on the side of the hole increases the friction coefficient, the main cause of pressure differential pipe sticking.

One method of reducing the percentage of smaller sized cuttings particles from the mud stream is by dilution of the whole mud volume by adding water or other liquid. This is often impractical and almost always expensive. The costs of adding water, providing for more pit volume, etc., will generally make it more desirable to remove solids mechanically such as by screening. However, dilution is frequently used to reduce the percentage solids content during drilling of the surface hole (the upper or shallower portion of the hole).

In a typical apparatus, the drill mud from the drilling apparatus is passed through six modular units or work stations comprising: (1) a shale shaker; (2) a degasser; (3) a desander; (4) a desilter; (5) a mud cleaner and (6) a centrifuge. The mud is initially fed into a shale shaker which separates large particles with the remaining drilling mud then being delivered to a first tank. It is pumped by a centrifugal pump from the first tank, through a degasser, and enters a second tank from which it is then pumped to a desander, and enters a third tank. It is then pumped through a desilter, or a mud cleaner, which, like the desander, is in the form of a cyclone filter or cleaner. It then enters a fourth tank, and is delivered to the mud tank or mud holding tank from the fourth tank.

Accordingly, the mud is moved in a batch type operation from one module (unit) of equipment to the next module by means of at least three energy consuming centrifugal pumps. Since the use of all modules of the equipment is not a continuous operation, only a portion of the total drilling fluids stream is actually processed through the entire system and the untreated mud in effect contaminates the treated mud.

It is generally accepted in the industry that present equipment usages permit no better than 50% removal of the solids (cuttings) of given size from the mud. While some mud systems have multiple units for "better" solids control, the costs are excessive. On a typical deep well where mud costs are high, equipment rental costs on the average are $1,500 per day. Some wells incur equipment rental costs in excess of $2,000 per day. Horsepower requirements for the pump and module operation of the equipment ranges from 430 to 450 Hp. Moreover assembly and piping costs often equal the buy-out price of the equipment. It will consequently be apparent that present known approaches to drilling mud treatment are both functionally inadequate and financially burdensome.

Although there have been proposals for simpler methods and apparatus for treatment of drilling mud such as in Lee U.S. Pat. No. 4,350,591, such apparatus has not found any substantial acceptance in the industry. This apparatus utilizes a filter belt passing over drums, and vibrating plates in engagement with the drilling mud delivered to the filter to assist in forcing the drilling mud through the filter.

The most dramatic improvement in mud treatment is the apparatus and method disclosed in prior U.S. Ser. No. 541,923 filed on Oct. 14, 1983 in which a continuous movable filter belt is mounted on supporting rollers for providing a horizontal flight to the upper surface of which drilling mud is supplied by a unique roller weir assembly. The upper flight of the filter belt passes over a vacuum table which incorporates degasser means for separating gas from the mud which has passed through the filter belt. A significant aspect of the operation of the apparatus is that substantially all of the cuttings are separated from the mud in that only the mud passes through the filter belt while the cuttings remain on the upper surface. Different embodiments of the apparatus incorporate different types of degasser means. The present invention represents an improvement over the aforementioned apparatus and method which provides even better results and which is easier to service and maintain.

BRIEF DESCRIPTION OF THE DRAWING

FIG. 2 is a top plan view of the preferred embodiment and including a phantom view of a second mud treatment unit as associated with the first unit in an alternative arrangement;

FIG. 3 is a rear elevation view;

FIG. 4 is a left end elevation view;

FIG. 5 is a right end elevation view;

FIG. 6A is the left portion of a sectional view taken along lines 6AB—6AB of FIG. 2;

FIG. 6B is the remaining, or right, portion of the sectional view taken along lines 6AB—6AB of FIG. 2;

FIG. 7A is a sectional view lines 7A of FIG. 6A;

FIG. 9 is a sectional view taken along lines 9—9 of FIG. 8;

FIG. 10 is a sectional view taken along lines 10—10 of FIG. 6A;

FIG. 11 is a sectional view taken along lines 11—11 of FIG. 6B;

FIG. 12 is a sectional view taken along lines 12—12 of FIG. 6A;

FIG. 13 is a sectional view taken along lines 13—13 of FIG. 12;

FIG. 14 is a sectional view taken along lines 14—14 of FIG. 12;

FIG. 15 is an exploded perspective view of a filter belt supporting vacuum table of the first embodiment;

FIG. 16 is a sectional view taken along lines 16—16 of FIG. 15;

FIG. 17 is a sectional view taken along lines 17—17 of FIG. 16;

FIG. 18 is a top plan view of slurry infeed means employed in the first embodiment;

FIG. 19 is a sectional view taken along lines 19—19 of FIG. 18;

FIG. 20 is a sectional view taken along lines 20—20 of FIG. 19;

FIG. 21 is a sectional view taken along lines 21—21 of FIG. 20;

FIG. 22 is a sectional view taken along lines 22—22 of FIG. 6A;

FIG. 23 is a sectional view taken along lines 23—23 of FIG. 22; and

FIG. 24 is a sectional view taken along lines 24—24 of FIG. 22.

DESCRIPTION OF THE PREFERRED EMBODIMENTS

Figure 1:
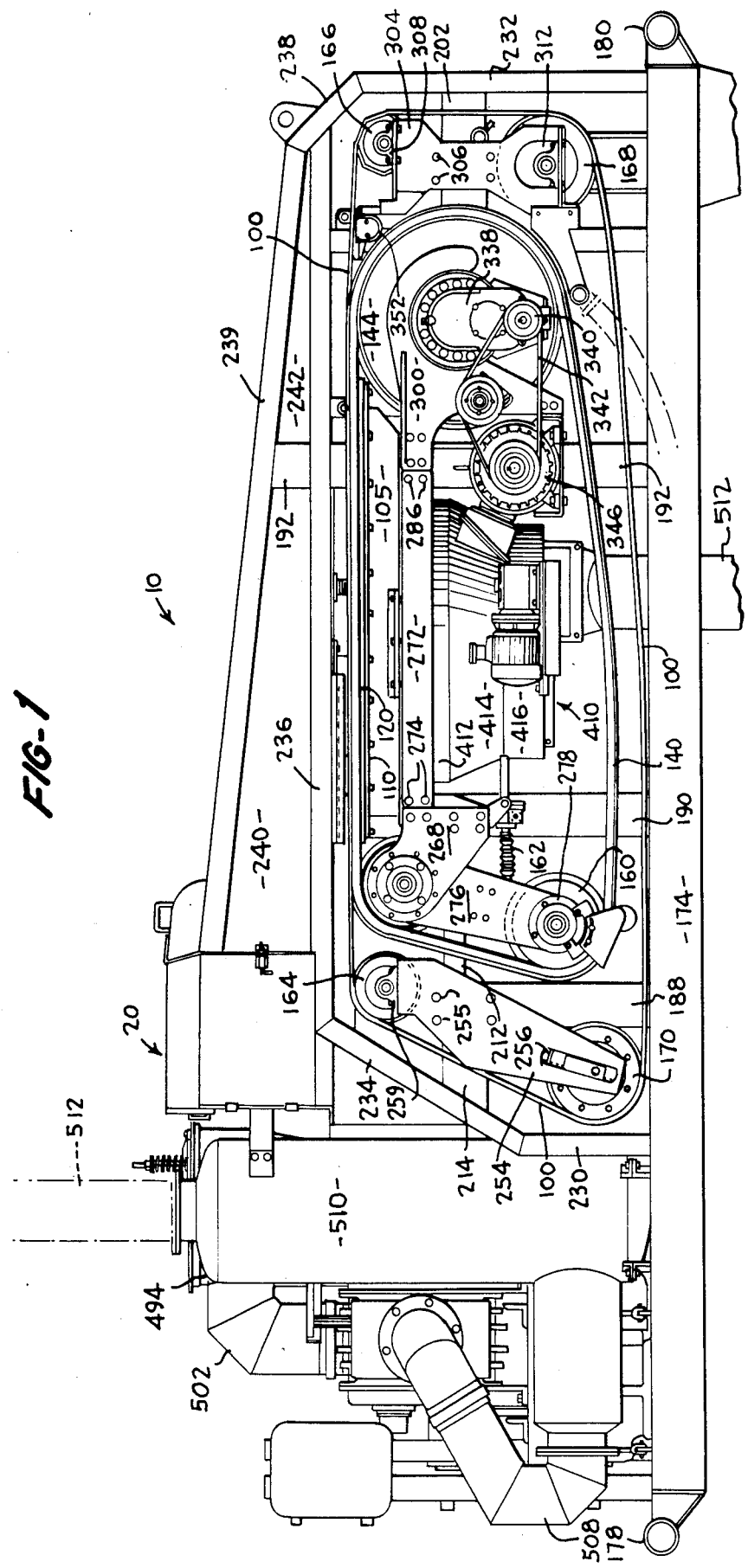
FIG. 1 is a front elevation view of a first embodiment of the invention.

The first embodiment of the invention comprises a movable unit, generally designated 10, for treating drilling mud or similar slurries for removing cuttings or other impurities without loss of the valuable solid constituents of the mud or slurry which is passed through the apparatus. The first embodiment includes an infeed means comprising a main infeed conduit 12 (FIG. 6A) which is connected to a mud supply conduit 14 (FIG. 2) which is in turn connected to a conduit 16 extending from a well casing from which the mixture of drilling mud and cuttings flows during a drilling operation. A flap valve 18 is provided for diverting the slurry mixture from conduit 16 into either conduit 14 or alternatively into a second mud supply conduit 14' connected to the infeed conduit of a second unit 10' which is identical to unit 10, as shown in FIG. 2. The arrangement of two units as shown in FIG. 2 permits operation of either unit while the other unit is being serviced. Moreover, flap valve 18 can be positioned in an intermediate position for simultaneous operation of both units 10 and 10'. Since the units are essentially identical, with the exception of the fact that they are in mirror relationship to each other, only one unit will be discussed.

The main infeed conduit 12 is connected to a reservoir 20 having a front wall 21 canted side walls 22 and 24 and a bottom wall 25 as shown in FIG. 10. The slurry flows from reservoir 20 over a horizontal plate 26 or a main transverse frame element 27 into a discharge chute defined by side walls 28 and 30 (FIG. 2) and a slightly inclined bottom wall 32. A support bar 34 extending between walls 28 and 30 supports 4 guide vanes 36 which are adjustably mounted for pivotal rotation about pivots 38 on bar 34 as best shown in FIGS. 2 and 6A. The slurry is discharged from the lower edge of bottom wall 32 into a roller weir assembly which includes a plurality of weir rollers 40 which are all driven in the same direction by a drive motor 42. Uniform feeding of the slurry onto the upper surface of the weir rollers 40 is enabled by adjustment of the guide vanes 36.

The details of the roller weir assembly 38 will now be discussed with particular reference being made to FIGS. 6A and 18 thorough 21. Weir roller drive motor 42 is connected to a step-down transmission 44 from which a transverse output shaft means 45 extends beneath transverse beam 43 with one end of the transverse power output shaft being connected to sprockets 46 and 47 in a rear housing 39 and the other end of the shaft being connected to sprockets 48 and 49 in a front housing 41. It should be noted that the "front" of the unit is that position closest to the viewer in FIG. 1. Drive chains 50, 52, 54 and 56 respectively extend over sprockets 46, 47, 48 and 49 as best shown in FIG. 18. Support for the weir rollers 40 is provided by first and second channel-like side frame members 58 and 60 which are of identical construction and which provide support at each end of each weir roller in an identical manner which is best illustrated in FIG. 20. A box beam 53 connects the left ends (as viewed in FIG. 18) of the frames 58 and 60 and splash plates 59 and 61 are provided between the ends of rollers 40 and frames 58 and 60 respectively. A roller bearing assembly 62 is fixedly mounted in an aperture in side frame means 58 and provides rotary support for a stub shaft 64 which is notched at its outer end to receive a drive pin 66 in a hollow plug 68 fixedly mounted in the outer end of a hollow metal cylinder 70 of roller 40. Metal cylinder 70 is provided with a plastic jacket 72 from which a radial fin 74 extends as best shown in FIG. 21.

Stub shaft 64 is additionally provided with both a driver sprocket 76 keyed to the stub shaft and an idler sprocket 78 mounted for free rotation on the outer end of the stub shaft. It should be observed that the positions of the driver sprocket 76 and idler sprocket 78 are reversed from that shown in FIG. 20 on the adjacent idler shafts 64' and 64" as shown in FIG. 19. The foregoing alternating relationship of the sprockets applies to all of the sprockets 76 and 78 in that their positions alternate from one shaft to the next for purposes to be described. A cover 79 is provided on side frame 58 and a similar cover 81 is provided on side frame 60 as shown in FIG. 2.

Drive chain 50 is drivingly fitted over drive sprocket 46 and is drivingly engaged with the right hand driven sprocket 76' as viewed in FIG. 19 and then passes downwardly under idler sprocket 78' and up over the next driven sprocket 76", etc., with the left end of the chain being fitted over an idler sprocket 80 mounted on the frame. The lower flight 50' of chain 50 then extends over adjustable idler 83 of a second frame mounted idler 82 and over idler 83 of tension maintaining means 84 and then back up over the drive sprocket 46 as shown in FIG. 19. Thus, it will be seen that drive chain 50 effects rotation of every other one of the driven sprockets 76 (along with their associated weir rollers 40) in the clockwise direction of the arrows as shown in FIG. 19.

Drive chain 52 effects rotation of the other remaining driven sprockets 76 which are not driven by chain 50 in the same direction as a consequence of the fact that the chain 52 is driven by drive sprockets 57 and passes beneath the idler sprocket 78' which is behind sprocket 76' (FIG. 18) and then up over the driver sprocket 76 of the second weir roller (as counted from right to left in FIG. 19), downwardly under the third idler roller, upwardly over the fourth driver roller, etc. Chain 52 then passes over a frame mounted idler 81, over a second idler sprocket in line with idler 82 and over idler sprocket 85 (FIG. 20) in tensioning means 84 and back to the drive sprocket 47. Thus, chain 52 drives the second, third, fourth and fifth driver sprockets 76 and their associated weir rollers 40 and chain 50 drives the first, third, fifth and seventh driver sprockets and their associated weir rollers so that the net effect is that all of the weir rollers are rotated in the same direction. Chains 54 and 56 provide power to rotate the rollers in exactly the same manner from the opposite end of the rollers.

It should also be appreciated that the driving arrangement maintains a proper timing between the adjacent weir rollers so that the radial fins 74 of all of the rollers are in the same relative position as shown in FIG. 6A. The fins 74 extend outwardly a sufficient distance so that only a small clearance space is provided between the outer surface of the fins and the next adjacent roller as the fins rotate past the next adjacent roller.

Rotation of the rollers effects movement of the slurry both down between adjacent rollers and from left to right as viewed in FIG. 6A and the radial fins 74 also serve to move large cuttings particles to the right to drop off the right most (downstream) roller as viewed in FIG. 6A expedite the flow of slurry between the rollers without clogging or obstruction by the larger particles. The mud and smaller cuttings particles move downwardly between the rollers 40 from which they fall onto canted flow plates 90 positioned beneath the weir rollers as shown in FIG. 6A. The slurry is gravationally discharged in curtain-like flow from the lower end of the flow plates 90 and falls onto the upper surface of the upper flight of a closed loop moving filter screen 100 which is moving to the right and riding across the upper surface of a vacuum table 102 as generally designated in FIG. 6A.

The moving filter screen assembly 100 is made preferably of a generally square mesh polyester. The screen is provided with openings of uniform size; however, different screens having different mesh sizes will normally be used for different drilling conditions. Generally speaking, the screens will range between 200 mesh having openings of approximately 24 microns to 100 mesh having opening of approximately 131 microns. The mesh screen is embedded in rubber guide strips 104 which extend along each side of the moving screen assembly.

Vacuum table 102 is best illustrated in FIGS. 15 and 22 and includes a main rectangular suction box frame consisting of front side portion formed of members 106, 107, 108 and 110 (FIG. 22) rear side portion formed of members 103, 109, 105 and 111 and end portions 112 and 113. A pan is defined by downwardly inclined end plates 114, 115 and front and rear side plates 116, 117 with the assembly defining a vacuum chamber having a lower centrally located discharge opening 118. The upper portions of the vacuum table 102 comprises a pair of carrier rails 120, 121 connected by transverse frame elements 122, 123 at each end. The carrier rails 120, 121 and the transverse frame elements 122, 123 are formed of strong plastic such as nylon having low friction characteristics and are dimensioned to receive side guide strips 150 of a filter carrier belt 140 which supports the filter screen assembly 100.

A ridged metal grid 124 formed of parallel transverse metal beams 126 and longitudinally extending rods 128 is matingly fitted within the confines of the frame formed of members 120, 121, 122 and 123 and rests on the upper surfaces of members 100, 111, 112 and 113. Low friction belt supporting carrier blocks 128 are supported on the rigid metal grid 124 and include transverse suction slots 130 extending through their vertical thickness and position maintaining slots 131 adjacent each end for matingly fitting over the transverse metal beams 126 to maintain the carrier blocks 128 in position on the the rigid metal grid 124. Carrier blocks 128 are formed of ultra high molecular weight plastic (polyethelene).

Additionally, the upstream end of vacuum table 102 (the right end as viewed in FIG. 15) consisting of that portion of the table over which the filter belt initially moves includes two open top puffer tube support blocks 132 formed of ultra high molecular weight plastic and extending transversely across the table. A metal tube 134 having a plurality of upwardly facing apertures 136 extends along the length of the interior of the open-topped puffer tube support block 132. Additionally, tranversely extending side blocks 138 are positioned adjacent and/or parallel to the sides of the puffer tube support block 132.

In operation, the moving filter screen belt 100, which is in the form of a closed loop, is traversed from left to right across the vacuum table as viewed in FIG. 6A with the filter screen being supported by the heavy filter support or carrier belt 140 which is also of closed loop construction and is recessed along its edges to receive rubber guide strips 104 of filter belt 100 and which has an upper flight extending across the upper surface of the vacuum table between an upstream support drum 142 and a driven downstream drive drum 144. The driven downstream drive drum 144 includes an outer metal cylinder 146 over which a rubber blanket 148 is fitted. It should be observed that the ends of rubber blanket 148 are recessed radially inward to receive longitudinally extending side edge lugs 150 of the filter support belt 140 as best shown in FIG. 11. The filter support or carrier belt 140 is also supported on a lower adjustable idler drum 160 as best shown in FIG. 1. Adjustment of the tension in support belt 140 is effected by adjustment means 162 which serves to pivot swing arm means 164 on which drum 160 is mounted.

The filter screen belt 100 is mounted on an upstream or front idler roller 164, a shaker roller 166, a lower downstream open idler 168 and an adjustable tensioning idler roll 170 which can be adjusted in slot 172 of supporting frame means 176 as shown in FIG. 1. It should be noted that driving movement of the moving filter screen belt 100 is effected by virtue of its contact with the driven filter support belt 140 on which the upper flight of filter screen 100 rests as illustrated in FIG. 1.

A unique feature of the assembly is the fact that the drum and roller members 142, 144, 160, 164, 166, 168 and 170 are all supported by cantilever beam means supported on the rear side of the machine as illustrated in FIG. 3. The aforementioned supporting means includes the main frame which includes a rear skid 172 and a front skid 174 as shown in FIG. 10. A drip plate 176 extends between the skid members 172 and 174. Skid members 172 and 174 are joined at their extreme ends by tubular frame elements 178 and 180 and are additionally joined at intermediate locations by transverse box frame members 182, 184 (FIG. 6A) and 186 (FIG. 6B) so that an extremely rigid and strong base support is provided. Vertical frame members 188, 190, 192, 196, 197, 198 and 200 extend upwardly from skid 172. A horizontal beam 202 extends between vertical frame members 196 and 200 (FIG. 6B) and a similar horizontal beam 204 extends between vertical frame members 196 and 192 as shown in FIG. 3. An inclined frame element 206 extends from the upper end of vertical frame member 200 and is connected at its upper end to a further elongated inclined frame element 208. Bracket 209 is welded to the outer surface of frame element 206. The upper end of vertical frame member 196 is welded to horizontal frame element 210 which has its outer ends welded to members 206 and 192. A rigid panel 211 is welded between members 192, 208 and 210.

Additionally, vertical frame members 188 and 190 are connected by horizontal frame member 212 and a short horizontal frame 214 is connected between frame member 188 and canted frame member 216 extending outwardly from the upper end of vertical frame member 187. Frame members 216 and 190 are joined by horizontal frame 218. The vertical frame components additionally include a downwardly extending vertical member 215 extending downwardly from horizontal frame member 214 and an upwardly extending frame member 217 extending upwardly from rear skid 172 and a canted connecting frame member 219 joining the frame members 215 and 217 as best shown in FIG. 3. A relatively short channel member 189 extends from the upper end of vertical frame member 188 and the upper surface of horizontal frame member 212.

Vertical frame members 230 and 232 extend upwardly from the front skid 174 and a canted frame member 234 extends from the upper end of vertical frame member 230 and is joined to a horizontal frame member 236 as shown in FIG. 1. The opposite end of horizontal frame member 236 is joined to a canted frame member 238 welded to the upper end of vertical frame 232 and welded to elongated canted frame member 239. Rigid plates 240 and 242 are welded to the frame members 236 and 239 as shown. A bracket 244 is also welded to member 238 and a rigid transverse frame member 246 is welded between the juncture of members 206, 208 and the juncture of members 238 239 with a similar transverse frame member 251 being provided between members 208 and 259. Transverse plate 247 and rear panel 248 are welded to members 200, 206, 232 and 234. An access panel 249 is provided on rear panel 248.

Cantilever support for the filter belt assembly, supporting rollers, the vacuum table and degasser means is specifically provided by frame members which extend transversely of the apparatus forwardly from the vertical frame members on the rear skid 172. More specifically, a horizontal box beam 250 extends forwardly from vertical frame member 188 as shown in FIG. 6A and is provided with a vertical flange 252 on its outer end which is bolted to a roller support plate 254 by bolt means 255 as shown in FIG. 7A. The lower end of roller support plate 254 is provided with slot means 256 in which a bearing supporting one end of the shaft of a tensioning idler roll 170 is adjustably mounted for permitting tensioning of the filter screen belt 100. The rear end of the tensioning idler roll 170 is supported by rear bearing means 262 mounted on frame member 219 as shown in FIG. 3. The upper end of roller support plate 254 supports front bearing means 258 for the front idler roll 164. The rear end of roll 164 is supported by rear bearing means 260 mounted on the upper end of short vertical frame member 189 as shown in FIG. 3.

Support for the forward ends of upstream support drum 142 and lower adjustable idler 164 is provided by horizontally extending box beams 264 and 266 (FIG. 6A) which extend forwardly in a cantilever manner from vertical frame member 190. A drum support plate 268 is bolted to flange means 270 on the outer ends of box beams 264 and 266. The upper end of drum support plate 268 provides support for front bearing means for the front end of the shaft of upstream support drum 142. The rear end of the shaft of upstream support drum 142 is supported in bearing means attached to frame member 212 (FIG. 3). Additionally, a downwardly extending drum support plate 276 is bolted to drum support plate 268 and supports adjustable front bearing means 278 for the lower adjustable idler drum 160. It should also be noted that one end of a horizontal frame member 272 is connected by bolt means 274 to the outer end of box beam 264.

Cantilever support for the drive drum 144 is provided by a composite cantilever beam extending forwardly from vertical frame member 192. The composite beam includes box beam component 280, an inverted channel component 282, a vertical longitudinal web plate 284 welded to the components 280 and 282 a front vertical plate 283 and a rear vertical plate 285. Horizontal frame 272 is connected by bolt means to a mounting plate 287 on the outer end of the composite cantilever beam 279 by bolt means 286. Additionally, a drum support plate 300 is bolted to the outer end of the composite cantilever beam 279 and provides support for drive motor and transmission means for drum 144 in a manner to be discussed.

Figure 7B:
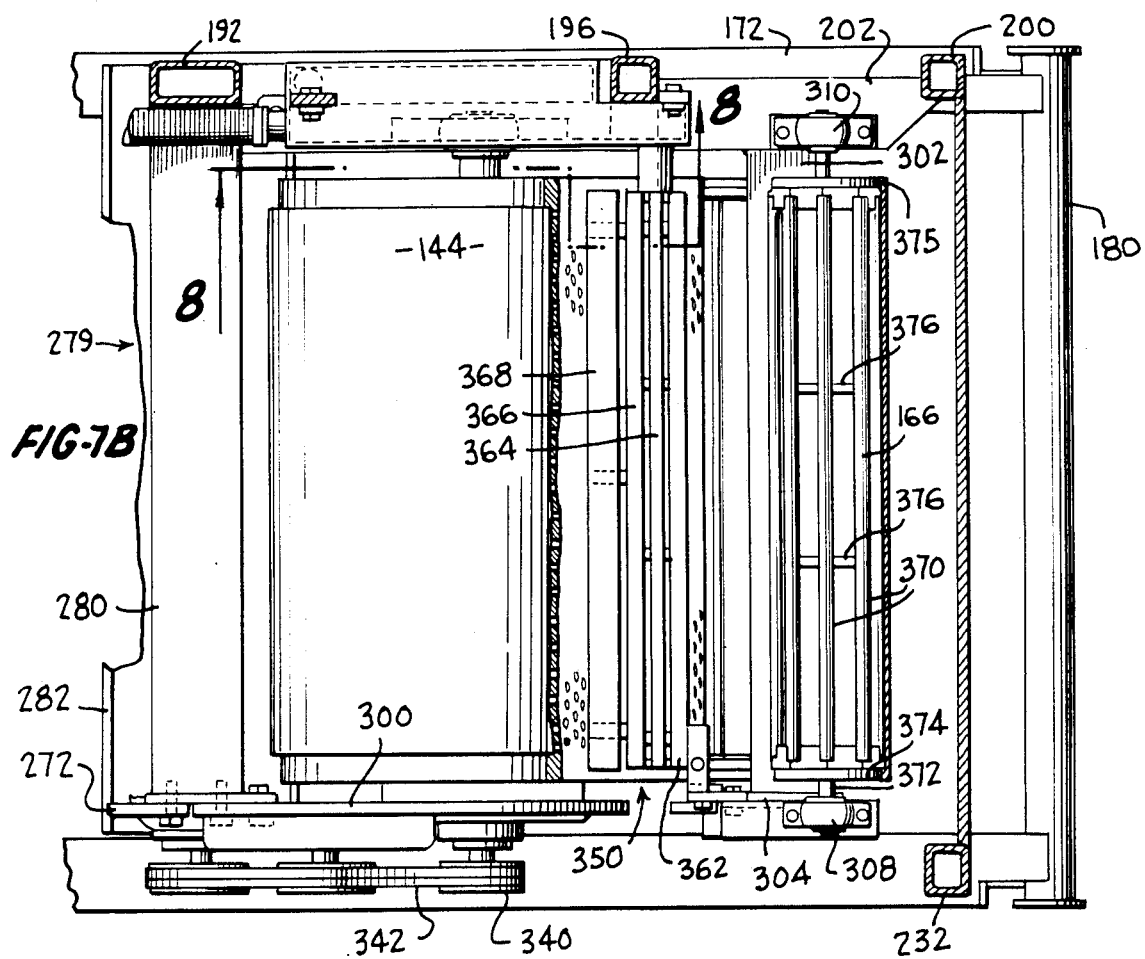
FIG. 7B is a sectional view taken lines 7B—7B of FIG. 6B.

Additionally, a horizontal cantilever box beam 302 extends forwardly from horizontal beam 202 as shown in FIG. 6B and provides support for a downstream roller support plate 304 (FIG. 1) bolted to its outer end by bolt means 306. An front bearing means 308 is mounted on the downstream frame roller support plate 304 for supporting the outer end of the shaft of shaker roller 166 and the inner end of the shaft of the shaker roller is supported by inner bearing means 310 as shown in FIG. 7B. The lower end of downstream roller support plate 304 supports a lower bearing 312 in which the outer end of the shaft of lower downstream idler 168 is carried. The inner end of the shaft of roller 168 is carried in bearing means 314 mounted on the upper end of vertical frame member 198 as shown in FIG. 3.

The mounting of the drive drum 144 and its associated drive motor and transmission means will now be discussed in detail with particular reference to FIGS. 1 and 11. Specifically, a rear bearing means 320 is mounted on horizontal beam 204 and provides support for the rear end of drum shaft 322 as best shown in FIGS. 3 and 11. Radial flanges 332 and 334 are attached to drum shaft 232 and to the inner periphery of the outer cylindrical shell or cylinder 146 of drum 144. A support housing 334 extends integrally inward from the drum support plate 300 as shown in FIG. 11 and provides support for a front bearing 336 in which the forward end of shaft 322 is mounted for rotation. A step-down transmission 338 has an output shaft connected through a coupling 340 to the end of shaft 322. It should be noted that the transmission 338 is supported by the housing 334 and includes power input pulley means 340 over which a pair drive belts 342 extend from a power output pulley on drum drive motor means 346 as shown in FIG. 1. A highly significant advantage of the assembly is that it permits forward (i.e., toward the viewer in FIG. 1) removal of the belts 100 and 140 without any need for disconnection and/or removal of the drum drive means.

Figure 8:
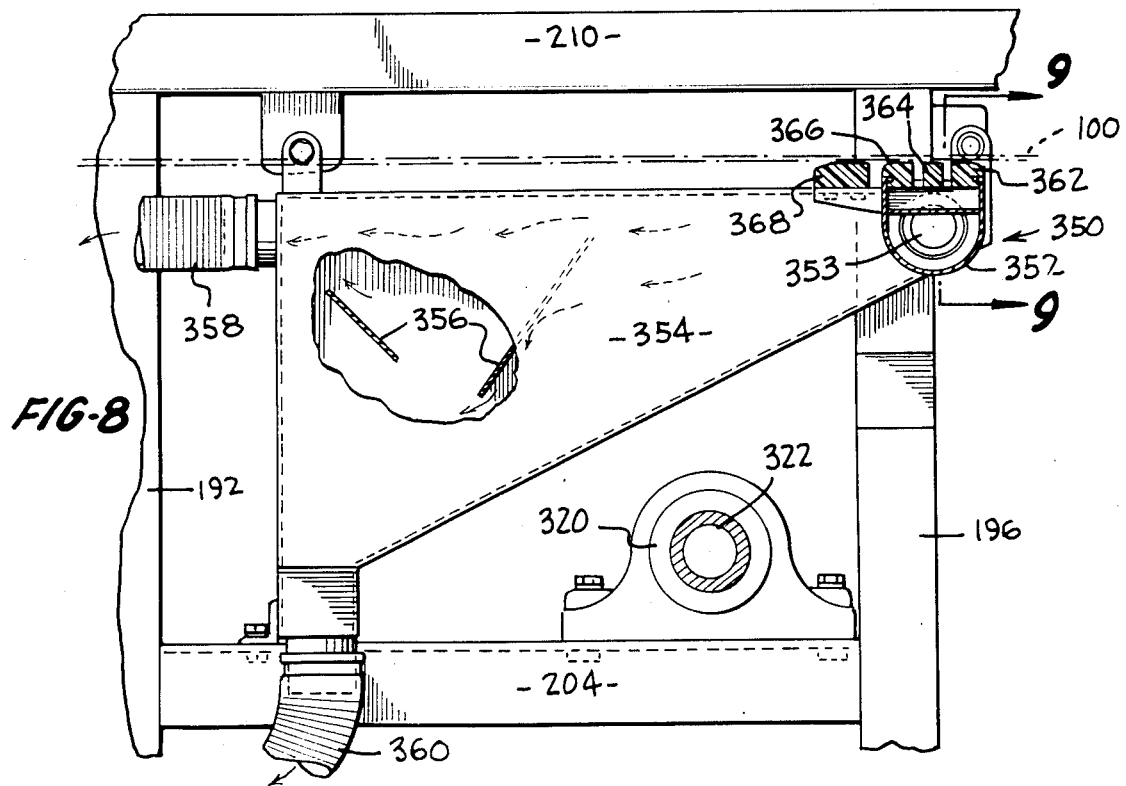
FIG. 8 is a sectional view taken along lines 8A—8A of FIG. 7B.

A scavenger vacuum device, generally designated 350 is provided downstream of the drive drum 144 as best shown in FIG. 6B and includes a U-shaped housing 352 in which internal deflector plates 353 (FIG. 9) are mounted. Housing 352 extends transversely across the width of the moving filter belt 100 below the upper flight thereof. An opening 353 in the rear end of housing 352 communicates with a vacuum plenum 354 having a hollow interior and interior deflector plates 356 as shown in FIG. 8. Additionally, vacuum plenum 354 is connected to a hose or other conduit 358 extending to a main frame plenum communicating with a vacuum pump in a manner to be discussed. Additionally a mud drain conduit 360 is connected to the lower end of vacuum plenum 354. The scavenger vacuum means 350 includes transversely extending nylon guide members 362, 364 and 366 supported by the U-shaped housing 352 and between which slots are provided so that vacuum in the housing acts on the screen member 100 as it passes over the nylon guide bars. Additionally, a slightly larger guide bar 368 is provided immediately upstream of guide bar 366 as shown in FIG. 8.

Shaker roller 166 (FIG. 7B) comprises eight cylindrical rods 370 mounted on a rotary shaft 372 by means of radial end discs 374, 375 and two intermediate internal discs 376. It should be observed that only the moving filter screen belt 100 passes over the shaker roller 166 and that rotation of the roller effectively shakes and vibrates the belt to aid in dislodging both liquid and solid particles that may be on the belt after it leaves drum 144 and passes over scavenger 350.

Open idler 168 comprises a hollow support shaft 380 supported by fixedly positioned bracket members 382 and 384 as shown in FIG. 12. A hose 386 connected to a source of pressurized liquid of the type used in the drilling mud slurry is connected to the outer end of hollow support shaft 380. Rotary bearing assemblies 388, 390 and 392 are fixed to the hollow shaft 380 and respectively provide support for front roller disc 394, an internal roller disc 396 and a rear roller disc 398 as shown. A plurality of longitudinal bars 399 are welded notches in the periphery of the discs 394, 396 and 398 to provide a rotary cage-like construction over which the filter belt assembly 100 passes. It should be noted that the discs are provided with notches 400 (FIG. 12) for receiving the rubber guide strips 104 of the filter screen assembly. Manifold tubes 402 and 404 are mounted on hollow support shaft 380 by means of support rods 406 and include a plurality of outwardly directed spray jet openings 408 which direct high pressure gas or liquid against the inner surface of the filter belt 100 for dislodging any particles remaining on the belt.

Degasser means 410 is provided immediately beneath vacuum table 102 for receiving the slurry and associated gases therefrom. The degasser includes a housing consisting of an upper cylindrical wall 412, an inwardly inclined conical wall 414, a lower cylindrical wall 416 and a planar bottom wall 418 as best shown in FIGS. 6A and 22. The degasser housing is supported beneath the vacuum table by bolt means 420 connected to an annular upper plate 422 of the degasser housing which includes an internal cylindrical surface 424 defining a large circular opening into which the lower ends of end plates 114, 115 and side plates 116, 117 of the vacuum table extend as shown in FIG. 22.

A hollow heavy rotor support column 420 extends upwardly from the bottom wall 418 of the degasser housing and includes a lower rotary bearing 422 and an upper rotary bearing 424 which support a heavy duty rotor shaft 426 for rotation about its vertical axis as shown. Pulley means 428 on the bottom of shaft 426 is connected by belt means 429 to an output pulley 430 of a step-down transmission 431 which receives power from a drive motor 432.

A rotor assembly, generally designated 440, is mounted on the upper end of shaft 426 and includes a lower horizontal disc 442 and an upper horizontal disc 444 between which radial plates 446 are provided. The radial plates 446 have inner termination edges 448 and outer termination edges 450. Upper disc 444 has a circular opening 452 communicating with the open space inside the inner edges 448 of the radial plates 446 and a cylindrical gas suction conduit 454 extends upwardly through opening 118 from the upper disc 444 for removing gas from the interior of the vacuum table and for consequently maintaining low pressure on the interior of the vacuum table.

It should be observed that the vacuum table includes a solid flow blocking baffle 456 immediately above the cylindrical gas suction conduit 454 for preventing slurry from falling into the gas suction conduit. Baffle 456 is identical to carrier blocks 128 with the exception of the fact that it does not have slots 130 passing through it. A cylindrical skirt 458 extends downwardly from the outer periphery of the lower disc 442 and is spaced inwardly from a fixedly positioned cylindrical sleeve 460 so that an annular passageway 462 is provided between shirt 458 and sleeve 460 as best shown is FIG. 22. A plurality of parallel canted vanes 464 are mounted on the degasser casing housing components 412, 414 and support the cylindrical sleeve 460 from their inner edges. Vanes 464 operate to give the slurry a rotational swirl as it descends downwardly through the degasser.

A gas outflow cylinder 470 is fixedly connected to the bottom wall 418 of the housing and surrounds the hollow support column 420 shown in FIG. 22. An internal spiral gas/slurry separator plate 472 has its inner surface welded to gas outflow cylinder 470 and has its outer surface welded to the inner surface of the lower cylindrical wall 416 of the housing. Gas outflow cylinder 470 is centered in the degasser housing and is also welded to the inner periphery of the spiral gas/slurry separator plate 472 which has its outer periphery welded to the inner surface of cylinder wall 416. An aperture 471 provided in the lower end of gas outflow cylinder 470 has an upper edge 474 and provides communication between the space under the spiral gas/separator plate 472 and the interior of cylinder 470.

A gas outflow plenum 474 (FIG. 23) communicates with the space beneath the spiral gas/slurry separator plate 472 and a mud outflow plenum 476 communicates on its inner end with the interior of the degasser housing at the juncture 477 of the lowest portion of spiral gas/slurry separator plate 472 and the bottom wall 418 of the housing to permit the gravational discharge of mud flowing down the spiral plate 472 outwardly through the mud outflow plenum. Mud from plenum 476 is discharged into a vertical conduit 512 extending to a mud tank (not shown). It should also be noted that a lower wall 478 of mud outflow plenum 476 has an upper end joined to the lower end of the spiral plate 472 (FIG. 22). Additionally, a vertical plate 480 defines one side wall of the gas outflow plenum 474 and extends inwardly into and is welded to the gas outflow cylinder 470 as shown in FIG. 23. A second divider wall 482 is connected to the gas outflow cylinder 470, the cylinder wall 416, the bottom wall 418 and the under surface of the spiral gas/slurry separator plate 472 to provide a clearly defined passage to the gas outflow plenum 474 from the opening in cylinder 470.

A vertical gas duct 484 is connected to the outer end of gas outflow plenum 474 and has its upper end connected to a main frame vacuum plenum chamber 485 defined by main frame components including inclined frame 208, outside side plate 486, a lower frame 488 and an inside plate 490 as best shown in FIGS. 3 and 6A. The forward end of the vacuum plenum chamber is connected to a vacuum separator tank 494 by connection through a passageway defined by the canted side wall 24 (FIG. 10), the right end of bottom wall 25 (as shown in FIG. 10), outer plate 496, horizontal plate 498 and canted plate 500 which cooperate to define a sealed passageway communicating with the interior of vacuum separator 494.

The upper end of separator tank 494 is connected to a conduit 502 which is connected to the inlet of a blower or vacuum pump 504 driven by electric motor 506 in a well known manner. The outlet from the blower or vacuum pump 504 is connected by conduit 508 to a silencer or muffler which can in turn be connected to a gas removal conduit 512 as shown in FIG. 4.

In operation, mud from a well head, or slurry from some other source, flows into the main infeed conduit 12 from which it is discharged past the guide vanes 36 onto the upper surfaces of weir rollers 40 as shown in FIG. 6A. The rollers are rotating in a clockwise direction as viewed in FIG. 6A and any larger particles in the slurry are mechanically conveyed over the tops of the rollers by the operation of the radial fins 34 so that they fall off of the right-hand roller 40 (as viewed in FIG. 6A) onto the right-hand flow plate 90 and then onto the upper surface of the moving filter screen belt 100 which is moving to the right as used in FIG. 6A. Essentially all of the slurry passes between the rollers 40 and is then guided downwardly onto the canted flow plates 90 from which it flows in a curtain-like manner onto the upper surface of the moving filter belt 100.

Essentially all of the slurry is deposited on the filter belt 100 in the area immediately above the two puffer bar support blocks 132. Air is injected into the tubes 134 at a pressure in the range of 80 to 100 lbs. per sq. inch and is ejected from the nozzles therein to act on the lower surface of the filter belt 100 to agitate the belt and the slurry on the belt to create a turbulent condition in the slurry and prevent bridging of the solid particles of the slurry over the apertures in the belt. However, vacuum table 102 maintains sub-atmospheric pressure beneath the filter in all areas other than those above the puffer bar assembly as it traverses from left to right across the table as viewed in FIG. 6A; consequently, the liquid constituents of the slurry and the solid additives are sucked through the filter belt into the vacuum table and fall on to the plates 114, 115, 116 and 117 to flow downwardly along the surface of the plates toward discharge opening 118. Since the space beneath the filter belt is maintained at negative pressure, gases entrained in the slurry are partially emitted therefrom and a portion of the gas is removed downwardly through opening 118 and the remainder is sucked downwardly through gas suction conduit 454 to pass through the circular opening 452 in upper disc 444 of the rotary assembly 440. Rotation of the rotary assembly 440 creates centrifugal force on the gas by reaction with the radial plates 446 to cause the gas to pass outwardly over the outer periphery of lower disc 442 and then downwardly through the annular flow space 462 into the lower portion of the degasser from which the gas then flows upwardly beneath the rotorary assembly 440 and into the gas outflow cylinder 470 from which it is removed by gas outflow plenum 474. Additionally, a portion of the gas passes downwardly through the discharge opening 118 across the upper surface of upper disc 444 and downwardly through the annular space in which the vanes 464 are mounted which is defined by cylindrical sleeve 460 and portions of members 412 and 414 as best shown in FIG. 22. The gas that passes through the vane area is also sucked upwardly into the upper end of gas outflow cylinder 470 in an obvious manner.

All of the liquid and solid constituents of the slurry which passes through the filter belt 100 flow downwardly through discharge opening 118 onto the upper rotating disc 444 and are consequently subjected to centrifugal force which slings the liquid and solid constituents against the inner surface of upper cylinder wall 412 of the degasser housing. Impact of the liquid and solid slurry against the wall 412 results in further freeing of gas from the slurry which is sucked downwardly through the annular space in which the canted vanes 464 are positioned. Additionally, the liquid and solid constituents of the slurry pass down through the vanes onto inner surface of conical wall 414 of the degasser housing from which they flow onto the upper surface of the spiral gas/slurry separator plate 472. The slurry then runs downwardly under the influence of gravity along the length of the plate 472 and is discharged outwardly through the mud outflow plenum 476 from which it flows to the mud tank.

After the filter support belt 144 leaves the area above the vacuum table, it then moves onto drive drum 144 and is separated from the filter belt 100 which passes over the scavenger vacuum device 350 which subjects belt 140 to further vacuum tending to remove any slurry particles still adhering to the filter belt. The slurry removed by device 350 flows into the vacuum plenum 354 and is discharged via drainage conduit 360 to flow to the mud tank. Gas and air flows outwardly through conduit 358 to the main frame plenum. The filter belt then passes over the shaker roller 166 which subjects it to vibrations extending back over the area above the scavenger vacuum device 350 to enchance the removal of any remaining liquid and solid particles on the filter member.

The filter belt then moves downwardly from shaker roller 166 over the lower downstream open idler 168 from which it receives jets of air or, alternatively, jets of liquid such as water or the like of the type employed as the liquid constituent of the slurry. The action of the air or liquid last on the filter belt completes cleaning of the belt and it then returns to the upstream end of the machine for passage over the lower adjustable drum idler 170 and the upper drum 164 back to the position where it merges with and is supported with the filter support belt 140 on upstream support drum 142 as best shown in FIG. 6A.

We claim:

1. Apparatus for separating relatively large particles from a slurry comprising a liquid carrier and small particles of value, said apparatus comprising:
    (a) filter means including an endless movable filter means having an upper surface and a lower surface connected by flow openings provided across substantially its entire length and width through which filtrate can flow and being mounted for movement along a path of movement having a primarily horizontal direction component;
    (b) drive means for moving said filter means along said path of movement;
    (c) infeed means for depositing a mixture of said slurry and said relatively large particles on an area of the upper surface of said filter means;
    (d) pressurized gas providing means positioned beneath said infeed means for applying pressurized gas at a pressure exceeding atmospheric pressure to the lower surface of said filter means in the area beneath which the slurry and relatively large particles are deposited for causing gas to pass upwardly through the filter means to agitate the slurry and the relatively large particles therein to create a turbulent condition in said area; and
    (e) suction means located downstream of said pressurized gas providing means relative to the direction of movement of the filter means for drawing substantially all of said slurry through said filter means to separate said slurry from said relatively large particles to provide purified slurry.

2. The apparatus of claim 1 wherein said suction means comprises a vacuum table over which said filter means moves, said vacuum table including:
    a vacuum chamber;
    a rigid grid defining the upper extent of said vacuum chamber; and
    a plurality of carrier blocks mounted on said rigid grid and each having an upper surface which supports said filter means as it moves across said vacuum table and transverse slots in said carrier blocks for communicating the vacuum chamber with the under surface of said filter means and mating means on the under surface of each of said carrier blocks for holding said carrier blocks in position on said rigid grid by engagement therewith.

3. The apparatus of claim 2 wherein said vacuum chamber includes a lower discharge opening and further including degasser means comprising a housing attached to the lower side of said vacuum table including an upper cylindrical wall, a horizontal rotor mounted for rotation in the spaced defined inwardly of said upper cylindrical wall beneath said lower discharge opening for receiving slurry therefrom and for hurling said slurry against said upper cylindrical wall to effect the separation of gas from the slurry, lower sidewall means extending downwardly from said upper cylindrical wall, a bottom wall welded to a lower portion of said lower side wall means, a spiral gas/slurry separator plate having an upper end and a lower end and an outer periphery welded to the inner surface of said lower sidewall means, a gas outflow cylinder having its lower end attached to said bottom wall and having an open upper end positioned above said spiral gas/slurry separator plate and having an outer surface welded to an inner surface of said spiral gas/slurry separator plate, a gas outflow plenum having one end connected to a gas outflow space inside said lower sidewall means, and beneath said spiral gas/slurry separator plate above said bottom wall and external of said gas outflow cylinder and having an opposite end connected to conduit means communicating with the inlet of a vacuum pump, an aperture in said gas outflow cylinder communicating the interior of said gas outflow cylinder with said outflow space and a slurry outflow plenum connected to a space inside said lower sidewall means and above said spiral gas/slurry separator plate for receiving slurry from the lower end of said spiral gas/slurry separator plate.

4. The apparatus of claim 1 additionally including:
    (f) upstream drum;
    (g) a downstream drum; and
    (h) wherein said filter means comprises a closed loop filter belt and a closed loop filter support belt which move as a unit along said path of movement over said upstream drum and said downstream drum but separating at said downstream drum; and further including;
    (i) vacuum scavenger means downstream of said downstream drum adjacent one surface of said closed loop filter belt for removing traces of said slurry adhering to said filter belt.

5. The apparatus of claim 4 wherein said suction means comprises a vacuum table over which said filter means moves, said vacuum table including:
    a vacuum chamber;
    a rigid grid defining the upper extent of said vacuum chamber;
    a plurality of carrier blocks mounted on said rigid grid and each having an upper surface which supports said filter means as it moves across said vacuum table and transverse slots in said carrier blocks for communicating the vacuum chamber with the under surface of said filter means and mating means on the under surface of each of said carrier blocks for holding said carrier blocks in position on said rigid grid by engagement therewith.

6. The apparatus of claim 5 wherein said vacuum chamber includes a lower discharge opening and further including degasser means comprising a housing attached to the lower side of said vacuum table including an upper cylindrical wall, a horizontal rotor mounted for rotation in the spaced defined inwardly of said upper cylindrical wall beneath said lower discharge opening for receiving slurry therefrom and for hurling said slurry against said upper cylindrical wall to effect the separation of gas from the slurry, lower sidewall means extending downwardly from said upper cylindrical wall, a bottom wall welded to a lower portion of said lower side wall means, a spiral gas/slurry separator plate having an upper end and a lower end and an outer periphery welded to the inner surface of said lower sidewall means, a gas outflow cylinder having its lower end attached to said bottom wall and having an open upper end positioned above said spiral gas/slurry separator plate and having an outer surface welded to an inner surface of said spiral gas/slurry separator plate, a gas outflow plenum having one end connected to a gas outflow space inside said lower sidewall means, and beneath said spiral gas/slurry separator plate above said bottom wall and external of said gas outflow cylinder and having an opposite end connected to conduit means communicating with the inlet of a vacuum pump, an aperture in said gas outflow cylinder communicating the interior of said gas outflow cylinder with said outflow space and a slurry outflow plenum connected to a space inside said lower sidewall means and above said spiral gas/slurry separator plate for receiving slurry from the lower end of said spiral gas/slurry separator plate.

7. The apparatus of claim 4 wherein said suction means comprises a vacuumtable over which said filter means moves, said vacuum table including:
   a vacuum chamber;
   a rigid grid defining the upper extent of said vacuum chamber; and
   a plurality of elongated carrier blocks mounted on said rigid grid and extending transversely relative to direction of movement of upper flight of said closed loop filter belt and each carrier block having an upper surface which supports said upper flight of said filter means as it mvoes across said vacuum table and slots in said carrier blocks for communicating the vacuum chamber with the under surface of siad upper flight of the filter means and mating on the under surface of each of said carrier blocks for holding said carrier clocks in position on said rigid grid by engagement therewith.

8. The apparatus of claim 7 wherein said vacuum chamber includes a lower discharge opening and further including degasser means comprising a housing attached to the lower side of said vacuum table including an upper cylindrical wall, a horizontal rotor mounted for rotation in the spaced defined inwardly of said upper cylindrical wall beneath said lower discharge opening for receiving slurry therefrom and for hurling said slurry against said upper cylindrical wall to effect the separation of gas from the slurry, lower sidewall means extending downwardly from said upper cylindrical wall, a bottom wall welded to a lower portion of said lower side wall means, a spiral gas/slurry separator plate having an upper end and a lower end and an outer periphery welded to the inner surface of said lower sidewall means, a gas outflow cylinder having its lower end attached to said bottom wall and having an open upper end positioned above said spiral gas/slurry separator plate and having an outer surface welded to an inner surface of said spiral gas/slurry separator plate, a gas outflow plenum having one end connected to a gas outflow space inside said lower sidewall means, and beneath said spiral gas/slurry separator plate above said bottom wall and external of said gas outflow cylinder and having an opposite end connected to conduit means communicating with the inlet of a vacuum pump, an aperture in said gas outflow cylinder communicating the interior of said gas outflow cylinder with said outflow space and a slurry outflow plenum connected to a space inside said lower sidewall means and above said spiral gas/slurry separator plate for receiving slurry from the lower end of said spiral gas/slurry separator plate.

9. The apparatus of claim 1 wherein said filter means is of endless closed loop configuration and is supported by drum means mounted on cantilever frame means carried by vertical frame means provided on one side of said apparatus so that said closed loop filter means can be removed outwardly from said drum means in a direction parallel to the axes of said drum means without there being any need for adjustment of the apparatus other than adjustment of the roller means to provide slack in the closed loop filter means.

10. The apparatus of claim 9 wherein said suction means comprises a vacuum table over which said filter means moves, said vacuum table including:
   a vacuum chamber;
   a rigid grid defining the upper extent of said vacuum chamber; and
   a plurality of carrier blocks mounted on said rigid grid and each having an upper surface which supports said filter means as it moves across said vacuum table and transverse slots in said carrier blocks for communicating the vacuum chamber with the under surface of said filter means and mating means on the under surface of each of said carrier blocks for holding said carrier blocks in position on said rigid grid by engagement therewith.

11. The apparatus of claim 10 wherein said vacuum chamber includes a lower discharge opening and further including degasser means comprising a housing attached to the lower side of said vacuum table including an upper cylindrical wall, a horizontal rotor mounted for rotation in the spaced defined inwardly of said upper cylindrical wall beneath said lower discharge opening for receiving slurry therefrom and for hurling said slurry against said upper cylindrical wall to effect the separation of gas from the slurry, lower sidewall means extending downwardly from said upper cylindrical wall, a bottom wall welded to a lower portion of said lower side wall means, a spiral gas/slurry separator plate having an upper end and a lower end and an outer periphery welded to the inner surface of said lower sidewall means, a gas outflow cylinder having its lower end attached to said bottom wall and having an open upper end positioned above said spiral gas/slurry separator plate and having an outer surface welded to an inner surface of said spiral gas/slurry separator plate, a gas outflow plenum having one end connected to a gas outflow space inside said lower sidewall means, and beneath said spiral gas/slurry separator plate above said bottom wall and external of said gas outflow cylinder and having an opposite end connected to conduit means communicating with the inlet of a vacuum pump, an aperture in said gas outflow cylinder communicating the interior of said gas outflow cylinder with said outflow space and a slurry outflow plenum connected to a space inside said lower sidewall means and above said spiral gas/slurry separator plate for receiving slurry from the lower end of said spiral gas/slurry separator plate.

12. The apparatus of claim 11 wherein said drum means comprises an upstream drum and a downstream drum and said filter means comprises a closed loop filter belt and a closed loop filter support belt which move as a unit along said path of movement over said upstream drum and said downstream drum but separating at said downstream drum; and further including vacuum scavenger means downstream of said downstream drum adjacent one surface of said closed loop filter belt for removing traces of said slurry adhering to said filter belt.

13. The apparatus of claim 1 wherein said infeed means comprises:
(f) a plurality of parallel rollers;
(g) shaft means extending from each end of each of said rollers;
(h) idler sprocket members mounted on said shaft means for relative rotation with respect to said shaft means;
(i) drive sprocket means keyed to each of said shaft means adjacent said idler sprocket means;
(j) motor means;
(k) first and second power output sprockets drivingly connected to said motor means;
(l) a first drive chain extending from said first power output sprocket over said drive sprocket means on alternate ones of said shaft means and on alternate ones of said idler rollers, and;
(m) a second drive chain extending from said second power output sprocket over those alternate drive sprocket means not engaged by said first drive chain and those idler sprocket members not engaged by said second drive chain so that operation of said motor means effects rotation of said rollers in the same direction.

14. The slurry feed means of claim 13 additionally including a radial flange extending outwardly of each of said rollers along the length thereof.

15. A method of rejuvenating drilling mud containing earth cuttings comprising:
(a) providing an endless filter having an upper surface and a lower surface;
(b) causing said endless filter to move along a predetermined path of travel;
(c) deliverying a mixture of drilling mud including cuttings solids to the upper surface of said endless filter;
(d) applying pressurized gas at a pressure exceeding atmospheric pressure to the lower surface of said endless filter beneath the location at which the drilling mud is deposited on the upper surface of the endless filter to cause gas to pass upwardly through the filter to consequently agitate the drilling mud and entrained cuttings on the upper surface of the filter; and
(e) applying suction to other portions of the lower surface of siad filter to effect drawing substantially all of said the drilling mud through the filter and leaving said cuttings solids on the upper surface of said endless filter and to provide rejuvenated mud beneath said filter.

16. The method of claim 15 wherein said endless filter is supported by a filter support belt during steps (b), (c), (d) and (e) and including the further steps of:
(f) separating said endless filter from said filter support belt; and
(g) passing said separated portion of said endless filter over a vacuum scavenger means to remove any additional drilling mud clinging to said endless filter.

17. The method of claim 15 wherein the drilling mud a carrier liquid and additive solids having a maximum size of approximately 74 microns.

18. The method of claim 17 wherein said endless filter is supported by a filter support belt during steps (b), (c), (d) and (e) and including the further steps of:
(f) separating said endless filter from said filter support belt; and
(g) passing said separated portion of said endless filter over a vacuum scavenger means to remove any additional drilling mud clinging to said endless filter.

19. A method of separating undesirable solid particles from a slurry comprising the steps of:
(a) continuously feeding a slurry mixture containing undesirable solid particles onto a surface area of a filter belt portion moving along a path of movement;
(b) continuously applying pressurized gas to the filter belt surface opposite the surface area to which said slurry mixture is fed, said gas being at a pressure exceeding the pressure of gas on portions of siad filter belt immediately adjacent the area on which the slurry mixture is fed so as to effect agitation of said slurry mixture; and
(c) creating a pressure differential across said filter belt portion immediately downstream of the area in which the pressurized gas is applied for drawing substantially all of said slurry through said filter belt portion and leaving the undesirable solid particles on the filter belt portion to separate the solid particles from the slurry.

20. The method of claim 19 wherein said filter belt is supported by a filter support belt during steps (a), (b) and (c), and including the further steps of (d) separating said filter belt from said filter support belt; and (e) passing said separated portion of said filter belt over a vacuum scavenger means to remove any additional drilling mud clinging to said endless filter.

* * * * *